United States Patent
Chen et al.

(10) Patent No.: US 7,583,728 B2
(45) Date of Patent: Sep. 1, 2009

(54) EQUALIZERS FOR LAYERED MODULATED AND OTHER SIGNALS

(75) Inventors: Ernest C. Chen, San Pedro, CA (US); Tung-Sheng Lin, Claremont, CA (US); Weizheng Wang, Rancho Palos Verdes, CA (US); William C. Lindsey, Pasadena, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 11/656,662

(22) Filed: Jan. 22, 2007

(65) Prior Publication Data

US 2007/0116108 A1 May 24, 2007

Related U.S. Application Data

(63) Continuation of application No. 10/691,133, filed on Oct. 22, 2003, now Pat. No. 7,184,473, and a continuation-in-part of application No. 10/691,032, filed on Oct. 22, 2003.

(60) Provisional application No. 60/421,241, filed on Oct. 25, 2002, provisional application No. 60/421,329, filed on Oct. 25, 2002.

(51) Int. Cl.
H03H 7/30 (2006.01)
(52) U.S. Cl. ..................... 375/229; 375/233
(58) Field of Classification Search .......... 375/229–234
See application file for complete search history.

(56) References Cited

U.S. PATENT DOCUMENTS

| 3,076,180 | A | 1/1963 | Havens et al. |
| 3,383,598 | A | 5/1968 | Sanders |
| 3,878,468 | A | 4/1975 | Falconer et al. |
| 3,879,664 | A | 4/1975 | Monsen |
| 3,974,449 | A | 8/1976 | Falconer |
| 4,039,961 | A | 8/1977 | Ishio et al. |

(Continued)

FOREIGN PATENT DOCUMENTS

DE 3642213 12/1986

(Continued)

OTHER PUBLICATIONS

Scott, R. P. et al.; Ultralow Phase Noise Ti:sapphire Laser Rivals 100 MHz Crystal Oscillator; Nov. 11-15, 2001; IEEE-Leos; pp. 1-2.

(Continued)

Primary Examiner—Emmanuel Bayard

(57) ABSTRACT

A method and apparatus for equalizing digital data signals is disclosed. The method comprises the steps of demodulating and decoding an input signal having input data to produce a data output, remodulating the data output to produce a training sequence including an idealized input signal, wherein the training sequence is comprised of adjacent symbols in the input data, and generating equalizer parameters from the training sequence. The apparatus comprises a demodulator (for demodulating an input signal to produce a data output), a modulator communicatively coupled to the demodulator (for remodulating the data output to produce a training sequence including an idealized input signal wherein the training sequence is comprised of adjacent symbols in the input data), and a parameter generation module communicatively coupled to the modulator (for generating equalizer parameters from the training sequence).

2 Claims, 27 Drawing Sheets

U.S. PATENT DOCUMENTS

| | | | |
|---|---|---|---|
| 4,068,186 A | 1/1978 | Sato et al. | |
| 4,213,095 A | 7/1980 | Falconer | |
| 4,253,184 A | 2/1981 | Gitlin et al. | |
| 4,283,684 A | 8/1981 | Satoh | |
| 4,384,355 A | 5/1983 | Werner | |
| RE31,351 E | 8/1983 | Falconer | |
| 4,416,015 A | 11/1983 | Gitlin | |
| 4,422,175 A * | 12/1983 | Bingham et al. | 375/232 |
| 4,484,337 A | 11/1984 | Leclert et al. | |
| 4,500,984 A | 2/1985 | Shimbo et al. | |
| 4,519,084 A | 5/1985 | Langseth | |
| 4,594,725 A | 6/1986 | Desperben et al. | |
| 4,628,507 A | 12/1986 | Otani | |
| 4,637,017 A | 1/1987 | Assal et al. | |
| 4,647,873 A | 3/1987 | Beckner et al. | |
| 4,654,863 A | 3/1987 | Belfield et al. | |
| 4,670,789 A | 6/1987 | Plume | |
| 4,709,374 A | 11/1987 | Farrow | |
| 4,800,573 A | 1/1989 | Cupo | |
| 4,829,543 A * | 5/1989 | Borth et al. | 375/329 |
| 4,835,790 A | 5/1989 | Yoshida et al. | |
| 4,847,864 A | 7/1989 | Cupo | |
| 4,860,315 A | 8/1989 | Hosoda et al. | |
| 4,878,030 A | 10/1989 | Vincze | |
| 4,896,369 A | 1/1990 | Adams et al. | |
| 4,918,708 A | 4/1990 | Pottinger et al. | |
| 4,993,047 A | 2/1991 | Moffat et al. | |
| 5,043,734 A | 8/1991 | Niho | |
| 5,088,110 A | 2/1992 | Bonnerot et al. | |
| 5,111,155 A | 5/1992 | Keate et al. | |
| 5,121,414 A | 6/1992 | Levine et al. | |
| 5,199,047 A | 3/1993 | Koch | |
| 5,206,889 A | 4/1993 | Unkrich | |
| 5,221,908 A | 6/1993 | Katz et al. | |
| 5,229,765 A | 7/1993 | Gardner | |
| 5,233,632 A | 8/1993 | Baum et al. | |
| 5,237,292 A | 8/1993 | Chethik | |
| 5,285,474 A | 2/1994 | Chow et al. | |
| 5,285,480 A * | 2/1994 | Chennakeshu et al. | 375/348 |
| 5,317,599 A | 5/1994 | Obata | |
| 5,329,311 A | 7/1994 | Ward et al. | |
| 5,337,014 A | 8/1994 | Najle et al. | |
| 5,353,307 A * | 10/1994 | Lester et al. | 375/233 |
| 5,412,325 A | 5/1995 | Meyers | |
| 5,430,770 A | 7/1995 | Abbey | |
| 5,450,623 A | 9/1995 | Yokoyama et al. | |
| 5,467,197 A | 11/1995 | Hoff | |
| 5,471,508 A | 11/1995 | Koslov | |
| 5,493,307 A | 2/1996 | Tsujimoto | |
| 5,513,215 A | 4/1996 | Marchetto et al. | |
| 5,555,257 A | 9/1996 | Dent | |
| 5,577,067 A | 11/1996 | Zimmerman | |
| 5,577,087 A | 11/1996 | Furuya | |
| 5,579,344 A | 11/1996 | Namekata | |
| 5,581,229 A | 12/1996 | Hunt | |
| 5,592,481 A | 1/1997 | Wiedeman et al. | |
| 5,602,868 A | 2/1997 | Wilson | |
| 5,603,084 A | 2/1997 | Henry et al. | |
| 5,606,286 A | 2/1997 | Bains | |
| 5,608,331 A | 3/1997 | Newberg et al. | |
| 5,625,640 A | 4/1997 | Palmer et al. | |
| 5,642,358 A | 6/1997 | Dent | |
| 5,644,592 A | 7/1997 | Divsalar et al. | |
| 5,648,955 A | 7/1997 | Jensen et al. | |
| 5,732,113 A | 3/1998 | Schmidl et al. | |
| 5,793,818 A | 8/1998 | Claydon et al. | |
| 5,815,531 A | 9/1998 | Dent | |
| 5,819,157 A | 10/1998 | Ben-Efraim et al. | |
| 5,828,710 A | 10/1998 | Beale | |
| 5,848,060 A | 12/1998 | Dent | |
| 5,870,439 A | 2/1999 | Ben-Efraim et al. | |
| 5,870,443 A | 2/1999 | Rahnema | |
| 5,937,004 A | 8/1999 | Fasulo et al. | |
| 5,940,025 A | 8/1999 | Koehnke et al. | |
| 5,940,750 A | 8/1999 | Wang | |
| 5,946,625 A | 8/1999 | Hassan et al. | |
| 5,952,834 A | 9/1999 | Buckley | |
| 5,956,373 A | 9/1999 | Goldston et al. | |
| 5,960,040 A | 9/1999 | Cai et al. | |
| 5,963,845 A | 10/1999 | Floury et al. | |
| 5,966,048 A | 10/1999 | Thompson | |
| 5,966,186 A | 10/1999 | Shigihara et al. | |
| 5,966,412 A | 10/1999 | Ramaswamy | |
| 5,970,098 A | 10/1999 | Herzberg | |
| 5,970,156 A * | 10/1999 | Hummelgaard et al. | 381/94.2 |
| 5,970,429 A | 10/1999 | Martin | |
| 5,978,652 A | 11/1999 | Burr et al. | |
| 5,987,068 A | 11/1999 | Cassia et al. | |
| 5,987,069 A | 11/1999 | Furukawa et al. | |
| 5,995,832 A | 11/1999 | Mallinckrodt | |
| 5,999,793 A | 12/1999 | Ben-Efraim et al. | |
| 6,002,713 A | 12/1999 | Goldstein et al. | |
| 6,008,692 A | 12/1999 | Escartin | |
| 6,018,556 A | 1/2000 | Janesch et al. | |
| 6,021,159 A | 2/2000 | Nakagawa | |
| 6,028,894 A | 2/2000 | Oishi et al. | |
| 6,032,026 A | 2/2000 | Seki et al. | |
| 6,034,952 A | 3/2000 | Dohi et al. | |
| 6,049,566 A | 4/2000 | Saunders et al. | |
| 6,052,586 A | 4/2000 | Karabinis | |
| 6,055,278 A | 4/2000 | Ho et al. | |
| 6,061,393 A | 5/2000 | Tsui et al. | |
| 6,072,841 A | 6/2000 | Rahnema | |
| 6,078,645 A | 6/2000 | Cai et al. | |
| 6,084,919 A | 7/2000 | Kleider et al. | |
| 6,104,747 A | 8/2000 | Jalloul et al. | |
| 6,108,374 A | 8/2000 | Balachandran et al. | |
| 6,125,148 A | 9/2000 | Frodigh et al. | |
| 6,125,260 A | 9/2000 | Wiedeman et al. | |
| 6,128,357 A | 10/2000 | Lu et al. | |
| 6,131,013 A | 10/2000 | Bergstrom et al. | |
| 6,134,282 A | 10/2000 | Ben-Efraim et al. | |
| 6,140,809 A | 10/2000 | Doi | |
| 6,141,534 A | 10/2000 | Snell et al. | |
| 6,144,708 A | 11/2000 | Maruyama | |
| 6,166,601 A | 12/2000 | Shalom et al. | |
| 6,177,836 B1 | 1/2001 | Young et al. | |
| 6,178,158 B1 | 1/2001 | Suzuki et al. | |
| 6,188,717 B1 | 2/2001 | Kaiser et al. | |
| 6,192,088 B1 | 2/2001 | Aman et al. | |
| 6,212,360 B1 | 4/2001 | Fleming et al. | |
| 6,219,095 B1 | 4/2001 | Zhang et al. | |
| 6,246,717 B1 | 6/2001 | Chen et al. | |
| 6,249,180 B1 | 6/2001 | Maalej et al. | |
| 6,266,534 B1 | 7/2001 | Raith et al. | |
| 6,272,679 B1 | 8/2001 | Norin | |
| 6,275,678 B1 | 8/2001 | Bethscheider et al. | |
| 6,297,691 B1 | 10/2001 | Anderson et al. | |
| 6,304,594 B1 | 10/2001 | Salinger | |
| 6,307,435 B1 | 10/2001 | Nguyen et al. | |
| 6,313,885 B1 | 11/2001 | Patel et al. | |
| 6,314,441 B1 | 11/2001 | Raghunath | |
| 6,320,464 B1 | 11/2001 | Suzuki et al. | |
| 6,320,919 B1 | 11/2001 | Khayrallah et al. | |
| 6,325,332 B1 | 12/2001 | Cellier et al. | |
| 6,330,336 B1 | 12/2001 | Kasama | |
| 6,333,924 B1 | 12/2001 | Porcelli et al. | |
| 6,335,951 B1 | 1/2002 | Cangiani et al. | |
| 6,366,309 B1 | 4/2002 | Siegle | |
| 6,369,648 B1 | 4/2002 | Kirkman | |
| 6,377,116 B1 | 4/2002 | Mattsson et al. | |
| 6,892,068 B2 | 4/2002 | Karabinis et al. | |
| 6,389,002 B1 | 5/2002 | Schilling | |
| 6,411,659 B1 | 6/2002 | Liu et al. | |

| | | |
|---|---|---|
| 6,411,797 B1 | 6/2002 | Estinto |
| 6,426,822 B1 | 7/2002 | Winter et al. |
| 6,429,740 B1 | 8/2002 | Nguyen et al. |
| 6,433,835 B1 | 8/2002 | Hartson et al. |
| 6,452,977 B1 | 9/2002 | Goldston et al. |
| 6,477,398 B1 | 11/2002 | Mills |
| 6,501,804 B1 | 12/2002 | Dietmar et al. |
| 6,515,713 B1 | 2/2003 | Nam |
| 6,522,683 B1 | 2/2003 | Smee et al. |
| 6,529,715 B1 | 3/2003 | Kitko et al. |
| 6,535,497 B1 | 3/2003 | Raith |
| 6,535,801 B1 | 3/2003 | Geier et al. |
| 6,574,235 B1 | 6/2003 | Arslan et al. |
| 6,597,750 B1 | 7/2003 | Knutson et al. |
| 6,657,978 B1 | 12/2003 | Millman |
| 6,661,761 B2 * | 12/2003 | Hayami et al. ............ 369/59.21 |
| 6,678,336 B1 | 1/2004 | Katoh et al. |
| 6,700,442 B2 | 3/2004 | Ha |
| 6,718,184 B1 | 4/2004 | Aiken et al. |
| 6,731,622 B1 | 5/2004 | Frank et al. |
| 6,731,700 B1 | 5/2004 | Yakhnich et al. |
| 6,745,050 B1 | 6/2004 | Forsythe et al. |
| 6,754,872 B2 | 6/2004 | Zhang et al. |
| 6,772,182 B1 | 8/2004 | McDonald et al. |
| 6,775,521 B1 | 8/2004 | Chen |
| 6,795,496 B1 | 9/2004 | Soma et al. |
| 6,809,587 B2 | 10/2004 | Ghannouchi et al. |
| 6,922,436 B1 * | 7/2005 | Porat et al. ................. 375/222 |
| 6,922,439 B2 | 7/2005 | Yamaguchi et al. |
| 6,934,314 B2 | 8/2005 | Harles et al. |
| 6,947,741 B2 | 9/2005 | Beech et al. |
| 6,956,841 B1 | 10/2005 | Stahle et al. |
| 6,956,924 B2 | 10/2005 | Linsky et al. |
| 6,970,496 B1 | 11/2005 | Ben-Bassat et al. |
| 6,980,609 B1 | 12/2005 | Ahn |
| 6,990,627 B2 | 1/2006 | Uesugi et al. |
| 6,999,510 B2 | 2/2006 | Batruni |
| 7,041,406 B2 | 5/2006 | Schuler et al. |
| 7,073,116 B1 | 7/2006 | Settle et al. |
| 7,079,585 B1 | 7/2006 | Settle et al. |
| 7,154,958 B2 | 12/2006 | Dabak et al. |
| 7,161,931 B1 | 1/2007 | Li et al. |
| 7,173,981 B1 | 2/2007 | Chen et al. |
| 7,209,524 B2 | 4/2007 | Chen |
| 7,230,992 B2 | 6/2007 | Walker et al. |
| 7,239,876 B2 | 7/2007 | Johnson et al. |
| 7,251,291 B1 | 7/2007 | Dubuc et al. |
| 7,263,119 B1 * | 8/2007 | Hsu et al. .................. 375/150 |
| 2001/0012322 A1 | 8/2001 | Nagaoka et al. |
| 2001/0016926 A1 * | 8/2001 | Riggle ....................... 714/709 |
| 2001/0024479 A1 | 9/2001 | Samarasooriya |
| 2001/0055295 A1 | 12/2001 | Akiyama et al. |
| 2002/0006795 A1 | 1/2002 | Norin et al. |
| 2002/0009141 A1 | 1/2002 | Yamaguchi et al. |
| 2002/0051435 A1 | 5/2002 | Giallorenzi et al. |
| 2002/0071506 A1 | 6/2002 | Lindquist et al. |
| 2002/0082792 A1 | 6/2002 | Bourde et al. |
| 2002/0136327 A1 | 9/2002 | El-Gamal et al. |
| 2002/0154705 A1 | 10/2002 | Walton et al. |
| 2002/0158619 A1 | 10/2002 | Chen |
| 2002/0172296 A1 | 11/2002 | Pilcher |
| 2002/0176516 A1 | 11/2002 | Jeske et al. |
| 2002/0186761 A1 | 12/2002 | Corbaton et al. |
| 2003/0002471 A1 | 1/2003 | Crawford et al. |
| 2003/0043941 A1 | 3/2003 | Johnson et al. |
| 2003/0072385 A1 | 4/2003 | Dragonetti |
| 2003/0138037 A1 | 7/2003 | Kaku et al. |
| 2003/0138040 A1 * | 7/2003 | Rouphael et al. ............ 375/233 |
| 2003/0147472 A1 | 8/2003 | Bach et al. |
| 2003/0171102 A1 | 9/2003 | Yang |
| 2003/0185310 A1 * | 10/2003 | Ketchum et al. ............ 375/259 |
| 2003/0194022 A1 | 10/2003 | Hammons et al. |
| 2004/0013084 A1 | 1/2004 | Thomas et al. |
| 2004/0091059 A1 | 5/2004 | Chen |
| 2004/0110467 A1 | 6/2004 | Wang |
| 2004/0137863 A1 | 7/2004 | Walton et al. |
| 2004/0146014 A1 | 7/2004 | Hammons et al. |
| 2004/0146296 A1 | 7/2004 | Gerszberg et al. |
| 2004/0196935 A1 | 10/2004 | Nieto |
| 2005/0008100 A1 | 1/2005 | Chen |
| 2005/0037724 A1 | 2/2005 | Walley et al. |
| 2006/0013333 A1 | 1/2006 | Chen |
| 2006/0022747 A1 | 2/2006 | Chen et al. |
| 2006/0045191 A1 | 3/2006 | Vasanth et al. |
| 2006/0056541 A1 | 3/2006 | Chen et al. |
| 2007/0121718 A1 * | 5/2007 | Wang et al. .................. 375/233 |

FOREIGN PATENT DOCUMENTS

| | | |
|---|---|---|
| EP | 0115218 | 8/1984 |
| EP | 0222076 | 8/1986 |
| EP | 0238822 | 9/1987 |
| EP | 0356096 | 2/1990 |
| EP | 0491668 A2 | 6/1992 |
| EP | 0874474 A2 | 10/1998 |
| EP | 0929164 | 7/1999 |
| EP | 1011245 | 6/2000 |
| EP | 1065854 | 1/2001 |
| FR | 2696295 | 4/1994 |
| FR | 2724522 | 3/1996 |
| JP | 2-005631 | 1/1990 |
| JP | 2-095033 | 4/1990 |
| JP | 03139027 | 6/1991 |
| JP | 5-041683 | 2/1993 |
| JP | 5-114878 | 5/1993 |
| JP | 5-252084 | 9/1993 |
| JP | 07-038615 | 2/1995 |
| JP | 2001-244832 | 9/2001 |
| JP | 2002118611 | 4/2002 |
| KR | 2001 0019997 | 3/2001 |
| WO | WO 99/00957 | 1/1999 |
| WO | WO 99/20001 | 4/1999 |
| WO | WO 99/23718 | 5/1999 |
| WO | 9933203 | 7/1999 |
| WO | 0079753 A1 | 12/2000 |
| WO | 0113532 A1 | 2/2001 |
| WO | WO 01/19013 | 3/2001 |
| WO | WO 01/39455 | 5/2001 |
| WO | WO 01/39456 | 5/2001 |
| WO | WO 01/80471 | 10/2001 |
| WO | WO 02/073817 | 9/2002 |
| WO | WO 03/105375 | 12/2003 |
| WO | WO 2005/074171 | 8/2005 |
| WO | WO 2005/086444 | 9/2005 |

OTHER PUBLICATIONS

Combarel, L. et al.; HD-SAT Modems for the Satellite Broadcasting in the 20 GHz Frequency Band; IEEE Transactions on Consumer Electronics; vol. 41, Issue 4; Nov. 1995; pp. 991-999.

U.S. Appl. No. 10/519,375, filed Dec. 22, 2004, Ernest C. Chen, Non-final Communication dated Dec. 27, 2007.

U.S. Appl. No. 10/913,927, filed Aug. 5, 2004, Ernest C. Chen, Non-final Communication dated Dec. 11, 2007.

U.S. Appl. No. 11/619,173, filed Jan. 2, 2007, Ernest C. Chen, Non-final Communication dated Nov. 15, 2007.

U.S. Appl. No. 10/532,631, filed Apr. 25, 2005, Paul R. Anderson, Non-final Communication dated Nov. 19, 2007.

U.S. Appl. No. 10/691,032, filed Oct. 22, 2003, Weizheng Wang, Non-final Communication dated Nov. 16, 2007.

U.S. Appl. No. 10/519,322, filed Dec. 23, 2004, Ernest C. Chen, Notice of Allowance dated Dec. 11, 2007.

U.S. Appl. No. 10/532,619, filed Apr. 25, 2005, Ernest C. Chen, Notice of Allowance dated Dec. 26, 2007.

U.S. Appl. No. 11/603,776, filed Nov. 22, 2006, Ernest C. Chen, Notice of Allowance dated Jan. 2, 2008.

U.S. Appl. No. 10/692,539, filed Oct. 24, 2003, Ernest C. Chen, Non-final Communication dated May 31, 2007.

U.S. Appl. No. 10/692,539, filed Oct. 24, 2003, Ernest C. Chen, Notice of Allowance dated Sep. 20, 2007.

U.S. Appl. No. 10/532,632, filed Apr. 25, 2005, Ernest C. Chen, Notice of Allowance dated Jan. 7, 2008.

Fang, T. et al.; "Fourth-Power Law Clock Recovery with Prefiltering", Proceedings of the International Conference on Communications (ICC), Geneva, May 23-26, 1993, New York, IEEE, US, vol. 3, May 23, 1993, pp. 811-815, XP010137089, ISBN:0-7803-0950-2, Section I, Introduction.

Janssen, G.J.M; Slimane, S.B.: "Performance of a Multiuser Detector for M-PSK Signals Based on Successive Cancellation", ICC 2001, 2001 IEEE International Conference on Communications, Conference Record, Helsinky, Finland, Jun. 11-14, 2001, XP010552960.

Slimane, S.B.; Janssen, G.J.M.: "Power Optimization of M-PSK Cochannel Signals for a Narrowband Multiuser Detector", 2001 IEEE Pacific Rim Conference on Communications, Computer and Signal Processing, Victoria, B.C., Canada, Aug. 26-28, 2001, XP010560334.

Soong, A.C.K.; Krzymien, W.A.: "Performance of a Reference Symbol Assisted Multistage Successive Interference Cancelling Receiver in a Multicell CDMA Wireless System", Conference Record, Communication Theory Mini-Conference GlobeCom '95, IEEE Singapore Nov. 13-17, 1995, XP010159490.

Arslan, H; Molnar, K: "Iterative Co-channel Interference Cancellation in Narrowband Mobile Radio Systems", Emerging Technologies Symposium: Broadband, Wireless Internet Access, 2000 IEEE Apr. 10-11, 2000, Piscataway, New Jersey, US, XP010538900.

Mazzini, Gianluca: "Power Division Multiple Access", Universal Personal Communications, 1998, ICUPC 1998, IEEE 1998, International Conference on Florence, Italy, Oct. 5-9, 1998, New York, NY, US, IEEE, US Oct. 5, 1998, pp. 543-546, XP010314962 ISBN: 0-7803-5106-1.

Saleh, A.A.M. et al.: "Adaptive Linearization of Power Amplifiers in Digital Radio Systems", Bell System Technical Journal, American Telephone and Telegraph Co., New York, US, vol. 62, No. 4, Part 1, Apr. 1, 1983, pp. 1019-1033, XP002028354.

Ramchandran, Kannan et al.: Multiresolution Broadcast for Digital HDTV Using Joint Source/Channel Coding, IEEE, vol. 11, No. 1, Jan. 1993, pp. 6-22.

Meyr, Heinrich et al.; "Digital Communication Receivers—Synchronization, Channel Estimation, and Signal Processing"; John Wiley & Sons, Inc.; 1998; pp. 212-213 and 217-218; XP 002364874.

Meyr, Heinrich et al.; "Digital Communication Receivers—Synchronization, Channel Estimation, and Signal Processing"; John Wiley & Sons, Inc.; 1998; pp. 610-612; XP 002364876.

Wolcott, Ted J. et al.; "Uplink-Noise Limited Satellite Channels"; IEEE 1995; pp. 717-721; XP-00580915.

Seskar, Ivan et al.; "Implementation Aspects for Successive Interface Cancellation in DS/CDMA Systems"; Wireless Networks; 1998; pp. 447-452.

Earth Station Technology; 1986; pp. 404-412; XP-002248387.

Chen, Ernest et al.; "DVB-S2 Backward-Compatible Modes: A Bridge Between the Present and the Future"; International Journal of Satellite Communications and Networking; vol. 22, Issue 3, pp. 341-365; published 2004 by John Wiley & Sons, Ltd.

Palicot, J., Veillard, J.; "Possible Coding and Modulation Approaches to Improve Service Availability for Digital HDTV Satellite Broadcasting at 22 GHz"; IEEE Transactions on Consumer Electronics; vol. 39, Issue 3; Aug. 1993; pp. 660-667.

U.S. Appl. No. 10/693,135, filed Oct. 24, 2003, Chen, Notice of Allowance Date Jun. 20, 2007.

U.S. Appl. No. 10/532,632, filed Apr. 25, 2003, Chen et al., Notice of Allowance date Jul. 29, 2007.

U.S. Appl. No. 10/692,491, filed Oct. 24, 2003, Ernest C. Chen, Date of Notice of Allowance Sep. 6, 2007.

U.S. Appl. No. 11/603,776, filed Nov. 22, 2006, Chen et al., Date of Notice of Allowance Aug. 29, 2007.

Arslan, Huseyin and Molnar, Karl; "Co-channel Interference Cancellation with Successive Cancellation in Narrowband TDMA Systems"; Wireless Communications and Networking Conference; 2000 IEEE; Sep. 23-28, 2000; Piscataway, New Jersey, USA; vol. 3; pp. 1070-1074; XP010532692; ISBN: 0-7803-6596-8.

Notice of Allowance dated Mar. 25, 2008 in U.S. Appl. No. 11/653,517, filed Jan. 16, 2007 by Ernest C. Chen.

EPO Communication dated Mar. 11, 2008 in European counterpart Application No. 03777694.5 of corresponding U.S. Appl. No. 10/532,509, filed Oct. 17, 2003 by Ernest C. Chen et al., now issued as Patent No. 7,230,480.

EPO Communication dated Mar. 27, 2008 in European counterpart Application No. 03742393.6 of corresponding U.S. Appl. No. 10/519,375, filed Jul. 3, 2003 by Ernest Chen et al.

Canadian Office Action dated Sep. 12, 2007 in Canadian counterpart Application No. 2491259 of corresponding U.S. Appl. No. 10/519,375, filed Jul. 3, 2003 by Ernest C. Chen et al.

Norwegian Office Action dated Jan. 15, 2007 in Norwegian counterpart Application No. 20026115 of corresponding U.S. Appl. No. 09/844,401, filed Apr. 27, 2001 by Ernest C. Chen, now Patent No. 7,209,524.

EPO Communication dated Aug. 3, 2007 in European counterpart application No. 03794510.2 of correponding U.S. Appl. No. 10/236,414, filed Sep. 6, 2002 by Ernest C. Chen et al.

Non-final Communication dated Oct. 16, 2007 in U.S. Appl. No. 10/962,346, filed Oct. 8, 2004 by Ernest Chen.

Non-final Communication dated Apr. 1, 2008 in U.S. Appl. No. 10/961,579 by Ernest Chen.

Notice of Allowance dated May 6, 2008 in U.S. Appl. No. 10/532,631, filed Apr. 25, 2005 by Paul R. Anderson et al.

Non-final Office Action dated Apr. 30, 2008 in U.S. Appl. No. 10/962,346, filed Oct. 8, 2004 by Ernest Chen.

Notice of Allowance dated Apr. 30, 2008 in U.S. Appl. No. 11/603,776, filed Nov. 22, 2006 by Ernest Chen et al.

EPO Communication dated Apr. 4, 2008 in European counterpart Application No. 03757359.9 corresponding to U.S. Appl. No. 10/165,710, filed Jun. 7, 2002 by Ernest Chen.

Notice of Allowance dated Mar. 12, 2008 in U.S. Appl. No. 11/655,001, filed Jan. 18, 2007 by Weizheng Wang et al.

Japanese Office Action dated Mar. 4, 2008 in Japanese counterpart Application No. 2004-297297 corresponding to U.S. Appl. No. 10/962,346, filed Oct. 28, 2004 by Ernest Chen.

EPO Communication dated Feb. 26, 2008 in European counterpart Application No. 04256234.8 corresponding to U.S. Appl. No. 10/962,346, filed Oct. 8, 2004 by Ernest Chen.

EPO Communication dated Feb. 7, 2008 in European counterpart Application No. 03742400.9 and received from European representative on Feb. 14, 2008 and corresponding to U.S. Appl. No. 10/519,322, filed Dec. 23, 2004 by Ernest Chen et al.

Notice of Allowance dated May 8, 2008 in U.S. Appl. No. 11/619,173, filed Jan. 2, 2007 by Ernest Chen et al.

Notice of Allowance dated May 6, 2008 in U.S. Appl. No. 10/532,632, filed Apr. 25, 2005 by Ernest Chen et al.

Notice of Allowance dated Apr. 21, 2008 in U.S. Appl. No. 10/519,322, filed Dec. 23, 2004 by Ernest Chen et al.

Canadian Office Action dated Nov. 29, 2007 in Canadian counterpart Application No. 2442400 corresponding to U.S. Appl. No. 09/844,401, filed Apr. 27, 2001 by Ernest Chen, now issued Apr. 24, 2007 as US Patent No. 7,209,524.

Combarel, L. and Lavan, E.; "HD-SAT (Race 2075): HDTV Broadcasting over KA-Band Satellite, Cable and MMDS"; International Broadcasting Convention; 1994; pp. 633-640; XP006505143.

EPO Communication dated May 6, 2008 in European counterpart Application No. 03774848.0 corresponding to U.S. Appl. No. 10/532,582, filed Apr. 25, 2005 by Ernest C. Chen et al., now issued Feb. 6, 2007 as US Patent No. 7,173,977.

EPO Communication dated May 6, 2008 in European counterpart Application No. 03777627.5 corresponding to U.S. Appl. No. 10/532,619, filed Apr. 25, 2005 by Ernest C. Chen.

Notice of Allowance dated May 22, 2008 in U.S. Appl. No. 10/532,619, filed Apr. 25, 2005 by Ernest C. Chen.

Notice of Allowance dated Jun. 2, 2008 in U.S. Appl. No. 10/691,032, filed Oct. 22, 2003 by Weizheng W. Wang et al.

Notice of Allowance dated Jun. 2, 2008 in U.S. Appl. No. 10/693,135, filed Oct. 24, 2003 by Ernest C. Chen.

Canadian Office Action dated Jan. 22, 2008 in Canadian counterpart Application No. 2487817 corresponding to U.S. Appl. No. 10/165,710, filed Jun. 7, 2002 by Ernest C. Chen.

Canadian Office Action dated Jan. 23, 2008 in Canadian counterpart Application No. 2484313 corresponding to U.S. Appl. No. 10/962,346, filed Oct. 8, 2004 by Ernest C. Chen.

Canadian Office Action dated Feb. 5, 2008 in Canadian counterpart Application No. 2503530 corresponding to U.S. Appl. No. 10/532,632, filed Apr. 25, 2005 by Ernest C. Chen et al.

Canadian Office Action dated Feb. 27, 2008 in Canadian counterpart Application No. 2515167 corresponding to U.S. Appl. No. 10/913,927, filed Aug. 5, 2004 by Ernest C. Chen.

Canadian Office Action dated Apr. 22, 2008 in Canadian counterpart Application No. 2502924 corresponding to U.S. Appl. No. 10/532,619, filed Apr. 25, 2005 by Ernest C. Chen.

Final Rejection dated Jun. 24, 2008 in U.S. Appl. No. 10/519,375, filed Dec. 22, 2004 by Ernest C. Chen et al.

Notice of Allowance dated Jun. 13, 2008 in U.S. Appl. No. 10/532,524, filed Apr. 25, 2005 by Ernest C. Chen et al.

European Search Report and Search Opinion dated Jun. 13, 2008 in European counterpart Application No. 07075745.5 corresponding to U.S. Appl. No. 09/844,401, filed Apr. 27, 2001 by Ernest C. Chen, now issued Apr. 24, 2007 as US Patent No. 7,209,524.

El-Gamal, Abbas and Cover, Thomas M.; "Multiple User Information Theory"; Proceedings of IEEE; vol. 68, No. 12; Dec. 1980; pp. 1466-1483; XP007904837.

Scalart, Pascal; Leclerc, Michel; Fortier, Paul; Huynh Huu Tue; "Performance Analysis of a COFDM/FM In-band Digital Audio Broadcasting System"; IEEE Transactions on Broadcasting, IEEE Service Center; Piscataway, New Jersey, USA; vol. 43, No. 2; Jun. 1, 1997; pp. 191-198; XP011006070.

Arslan, Huseyin and Molnar, Karl; "Successive Cancellation of Adjacent Channel Signals in FDMA/TDMA Digital Mobile Radio Systems"; Vehicular Technology Conference; 48th IEEE VTC; Ottawa, Canada; May 18-21, 1998; New York, New York, USA; vol. 3; May 18, 1998; pp. 1720-1724; XP010288123.

Non-Final Office Action dated Jun. 17, 2008 in U.S. Appl. No. 10/913,927, filed Aug. 5, 2004 by Ernest C. Chen.

EPO Summons to attend Oral Proceedings dated Jul. 18, 2008 in European counterpart Application No. 027289894.3 corresponding to U.S. Appl. No. 09/844,401, filed Apr. 27, 2001 by Ernest Chen, now issued Apr. 24, 2007 as US Patent No. 7,209,524.

Taiwanese Office Action dated May 14, 2008 in Taiwan counterpart Application No. 092129629 corresponding to U.S. Appl. No. 10/532,631, filed Apr. 25, 2005 by Paul R. Anderson et al.

Canadian Office Action dated Aug. 5, 2008 in Canadian counterpart Application No. 2503532 corresponding to U.S. Appl. No. 10/532,509, filed Oct. 17, 2003 by Ernest C. Chen et al., now issued Jun. 12, 2007 as US Patent No. 7,230,480.

Chinese Office Action dated Aug. 22, 2008 in Chinese Patent Application No. 200410100591.6 filed Oct. 10, 2004 by Ernest Chen.

Notice of Allowance dated Oct. 23, 2008 in U.S. Appl. No. 10/961,579, filed Oct. 8, 2004 by Ernest C. Chen.

Notice of Allowance dated Oct. 23, 2008 in U.S. Appl. No. 10/962,346, filed Oct. 8, 2004 by Ernest C. Chen.

Non-final Office Action dated Dec. 16, 2008 in U.S. Appl. No. 12/176,533 filed Jul. 21, 2008 by Ernest C. Chen et al.

EPO Communication dated Oct. 17, 2008 in European Patent Application No. 03774848.0 filed Oct. 15, 2003 by Ernest Chen et al.

EPO Communication dated Nov. 18, 2008 in European Patent Application No. 03742393.6 filed Jul. 03, 2003 by Ernest Chen et al.

Non-final Office Action dated Dec. 03, 2008 in U.S. Appl. No. 10/913,927 filed Aug. 05, 2004 by Ernest Chen.

* cited by examiner

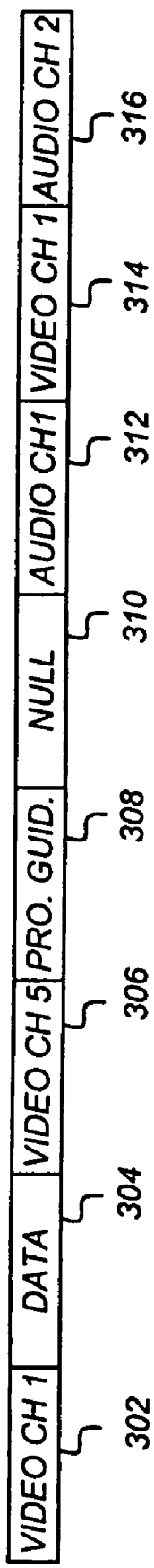
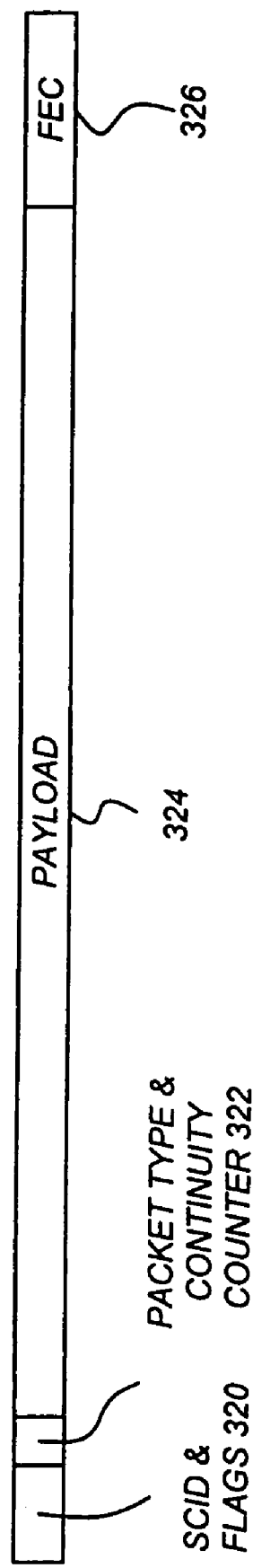

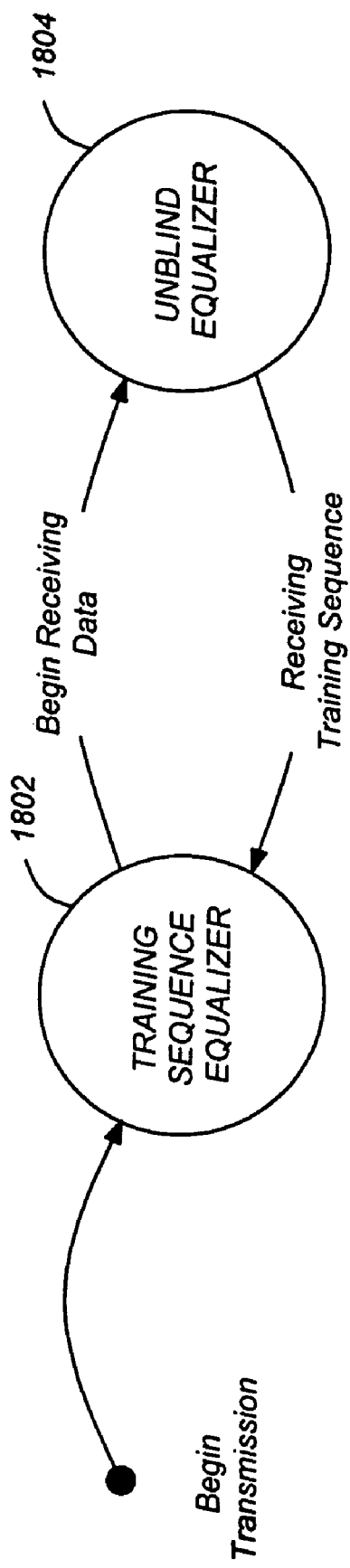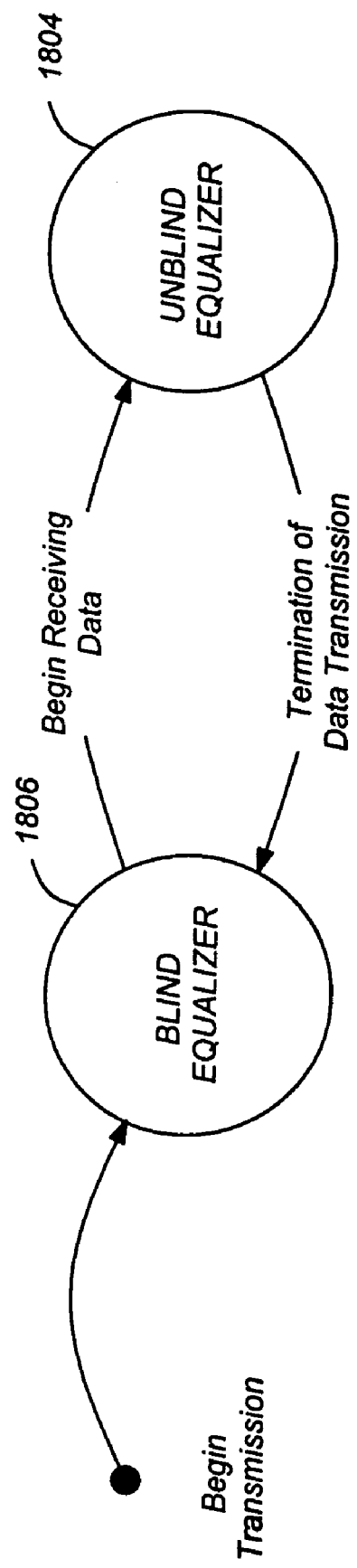

EQUALIZERS FOR LAYERED MODULATED AND OTHER SIGNALS

CROSS-REFERENCE TO RELATED APPLICATIONS

This application is a continuation of U.S. patent application Ser. No. 10/691,133, entitled "EQUALIZERS FOR LAYERED MODULATION AND OTHER SIGNALS", filed Oct. 22, 2003, by Ernest C. Chen, Tung-Sheng Lin, Weizheng Wang, and William C. Lindsey, now issued as U.S. Pat. No. 7,184,473, which application claims benefit of U.S. Provisional Patent Application No. 60/421,241, entitled "EQUALIZERS FOR LAYERED MODULATED AND OTHER SIGNALS", filed Oct. 25, 2002, by Ernest C. Chen, Tung-Sheng Lin, Weizheng Wang, and William C. Lindsey, and which application is also a continuation-in-part of the following and commonly assigned patent application(s), all of which foregoing and following applications are hereby incorporated by reference herein:

Utility application Ser. No. 09/844,401, filed Apr. 27, 2001, by Ernest C. Chen, entitled "LAYERED MODULATION FOR DIGITAL SIGNALS, " now issued as U.S. Pat. No. 7,209,524.

Utility patent application Ser. No. 10/691,032, filed Oct. 22, 2003, by Weizheng Wang, Tung-Sheng Lin, Ernest C. Chen, and William C. Lindsey, entitled "UNBLIND EQUALIZER ARCHITECTURE FOR DIGITAL COMMUNICATION SYSTEMS", which application claims the benefit of U.S. Provisional Patent Application No. 60/421,329, filed Oct. 25, 2002, by Weizheng Wang, Tung-Sheng Lin, Ernest C. Chen, and William C. Lindsey, entitled "INNOVATIVE UNBLIND EQUALIZER ARCHITECTURE FOR DIGITAL COMMUNICATION SYSTEMS. "

BACKGROUND OF THE INVENTION

1. Field of the Invention

The present invention relates to systems and methods for transmitting data, and in particular to a system and method for equalizing digital data signals.

This Application is also related to the following:

application Ser. No. 11/653,517, entitled "LAYERED MODULATION FOR DIGITAL SIGNALS", filed on Jan. 16, 2007, by Ernest C. Chen, which is a continuation of application Ser. No. 09/844,401, entitled "LAYERED MODULATION FOR DIGITAL SIGNALS", filed on Apr. 27, 2001, by Ernest C. Chen, now issued as U.S. Pat. No. 7,209,524;

application Ser. No. 10/165,710, entitled "SATELLITE TWTA ON-LINE NON-LINEARITY MEASUREMENT", filed on Jun. 7, 2002, by Ernest C. Chen, which is a continuation-in-part of application Ser. No. 09/844,401, entitled "LAYERED MODULATION FOR DIGITAL SIGNALS", filed on Apr. 27, 2001, by Ernest C. Chen, now issued as U.S. Pat. No. 7,209,524;

application Ser. No. 10/236,414, entitled "SIGNAL, INTERFERENCE AND NOISE POWER MEASUREMENT", filed on Sep. 6, 2002, by Ernest C. Chen and Chinh Tran, which is a continuation-in-part of application Ser. No. 09/844,401, entitled "LAYERED MODULATION FOR DIGITAL SIGNALS", filed on Apr. 27, 2001, by Ernest C. Chen, now issued as U.S. Pat. No. 7,209,524;

application Ser. No. 10/693,135, entitled "LAYERED MODULATION FOR ATSC APPLICATIONS", filed on Oct. 24, 2003, by Ernest C. Chen, which claims benefit to Provisional Patent Application No. 60/421,327, filed Oct. 25, 2002 and which is a continuation-in-part of application Ser. No. 09/844,401, entitled "LAYERED MODULATION FOR DIGITAL SIGNALS", filed on Apr. 27, 2001, by Ernest C. Chen, now issued as U.S. Pat. No. 7,209,524;

application Ser. No. 10/913,927, entitled "CARRIER TO NOISE RATIO ESTIMATIONS FROM A RECEIVED SIGNAL", filed on Aug. 5, 2004, by Ernest C. Chen, which is a continuation in part of application Ser. No. 09/844,401, entitled "LAYERED MODULATION FOR DIGITAL SIGNALS", filed on Apr. 27, 2001, by Ernest C. Chen, now issued as U.S. Pat. No. 7,209,524;

application Ser. No. 11/619,173, entitled "PREPROCESSING SIGNAL LAYERS IN LAYERED MODULATION DIGITAL SIGNAL SYSTEM TO USE LEGACY RECEIVERS", filed Jan. 2, 2007, which is a continuation of application Ser. No. 10/068,039, entitled "PREPROCESSING SIGNAL LAYERS IN LAYERED MODULATION DIGITAL SIGNAL SYSTEM TO USE LEGACY RECEIVERS", filed on Feb. 5, 2002, by Ernest C. Chen, Tiffany S. Furuya, Philip R. Hilmes, and Joseph Santorn now issued as U.S. Pat. No. 7,245,671, which is a continuation-in-part of application Ser. No. 09/844,401, entitled "LAYERED MODULATION FOR DIGITAL SIGNALS", filed on Apr. 27, 2001, by Ernest C. Chen, now issued as U.S. Pat. No. 7,209,524;

application Ser. No. 10/693,421, entitled "FAST ACQUISITION OF TIMING AND CARRIER FREQUENCY FROM RECEIVED SIGNAL", filed on Oct. 24, 2003, by Ernest C. Chen, now issued as U.S. Pat. No. 7,151,807, which claims priority to Provisional Patent application Ser. No. 60/421,292, filed Oct. 25, 2002, and which is a continuation-in-part of application Ser. No. 09/844,401, entitled "LAYERED MODULATION FOR DIGITAL SIGNALS", filed on Apr. 27, 2001, by Ernest C. Chen, now issued as U.S. Pat. No. 7,209,524;

application Ser. No. 11/603,776, entitled "DUAL LAYER SIGNAL PROCESSING IN A LAYERED MODULATION DIGITAL SIGNAL SYSTEM", filed on Nov. 22, 2006, by Ernest C. Chen, Tiffany S. Furuya, Philip R. Hilmes, and Joseph Santoru, which is a continuation of application Ser. No. 10/068,047, entitled "DUAL LAYER SIGNAL PROCESSING IN A LAYERED MODULATION DIGITAL SIGNAL SYSTEM", filed on Feb. 5, 2002, by Ernest C. Chen, Tiffany S. Furuya, Philip R. Hilmes, and Joseph Santom, now issued as U.S. Pat. No. 7,173,981, which is a continuation-in-part of application Ser. No. 09/844,401, entitled "LAYERED MODULATION FOR DIGITAL SIGNALS", filed on Apr. 27, 2001, by Ernest C. Chen, now issued as U.S. Pat. No. 7,209,524;

application Ser. No. 10/962,346, entitled "COHERENT AVERAGING FOR MEASURING TRAVELING WAVE TUBE AMPLIFIER NONLINEARITY", filed on Oct. 8, 2004, by Ernest C. Chen, which claims priority to Provisional Patent Application Ser. No. 60/510,368, filed Oct. 10, 2003, and which is a continuation-in-part of Application Ser. No. 09/844,401, entitled "LAYERED MODULATION FOR DIGITAL SIGNALS", filed on Apr. 27, 2001, by Ernest C. Chen, now issued as U.S. Pat. No. 7,209,524;

application Ser. No. 11/655,001, entitled "AN OPTIMIZATION TECHNIQUE FOR LAYERED MODULATION", filed on Jan. 18, 2007, by Weizheng W. Wang, Guancai Zhou, Tung-Sheng Lin, Ernest C. Chen, Joseph Santoru, and William Lindsey, which claims priority to Provisional Patent Application No. 60/421,293, filed Oct. 25, 2002, and which is a continuation of application Ser. No. 10/693,140, entitled "OPTIMIZATION TECHNIQUE FOR LAYERED MODULATION", filed on Oct. 24, 2003, by Weizheng W. Wang, Guancai Zhou, Tung-Sheng Lin, Ernest C. Chen, Joseph Santoru, and William Lindsey, now issued as U.S. Pat. No. 7,184,489, which is a continuation-in-part of application Ser. No. 09/844, 401, entitled "LAYERED MODULATION FOR DIGITAL SIGNALS", filed on Apr. 27, 2001, by Ernest C. Chen, now issued as U.S. Pat. No. 7,209,524;

application Ser. No. 11/656,662, entitled "EQUALIZERS FOR LAYERED MODULATION AND OTHER SIGNALS", filed on Jan. 22, 2007, by Ernest C. Chen, Tung Sheng Tin, Weizheng W. Wang, and William C. Lindsey, which claims priority to Provisional Patent Application No. 60/421,241, filed Oct. 25, 2002, and which is a continuation of application Ser. No. 10/691,133, entitled "EQUALIZERS FOR LAYERED MODULATED AND OTHER SIGNALS", filed on Oct. 22, 2003, by Ernest C. Chen, Tung-Sheng Tin, Weizheng W. Wang, and William C. Lindsey, now issued as U.S. Pat. No. 7,184,473, which is a continuation-in-part of application Ser. No. 09/844,401, entitled "LAYERED MODULATION FOR DIGITAL SIGNALS", filed on Apr. 27, 2001, by Ernest C. Chen, now issued as U.S. Pat. No. 7,209,524;

application Ser. No. 10/961,579, entitled "EQUALIZATION FOR TWTA NONLINEARITY MEASUREMENT" filed on Oct. 8, 2004, by Ernest C. Chen, which is a continuation-in-part of application Ser. No. 09/844,401, entitled "LAYERED MODULATION FOR DIGITAL SIGNALS", filed on Apr. 27, 2001, by Ernest C. Chen, now issued as U.S. Pat. No. 7,209,524;

application Ser. No. 10/532,632, entitled "LOWER COMPLEXITY LAYERED MODULATION SIGNAL PROCESSOR", filed on Apr. 25, 2005, by Ernest C. Chen, Weizheng W. Wang, Tung-Sheng Tin, Guangcai Zhou, and Joseph Santorn, which is a National Stage Application of PCT US03/32264, filed Oct. 10, 2003, which claims priority to Provisional Patent Application No. 60/421,331, entitled "LOWER COMPLEXITY LAYERED MODULATION SIGNAL PROCESSOR", filed Oct. 25, 2002, by Ernest C. Chen, Weizheng W. Wang, Tung-Sheng Tin, Guangcai Zhou, and Joseph Santorn, and which is a continuation-in-part of application Ser. No. 09/844,401, entitled "LAYERED MODULATION FOR DIGITAL SIGNALS", filed on Apr. 27, 2001, by Ernest C. Chen, now issued as U.S. Pat. No. 7,209,524;

application Ser. No. 10/532,631, entitled "FEEDER LINK CONFIGURATIONS TO SUPPORT LAYERED MODULATION FOR DIGITAL SIGNALS", filed on Apr. 25, 2005, by Paul R. Anderson, Joseph Santorn and Ernest C. Chen, which is a National Phase Application of PCT US03/33255, filed Oct. 20, 2003, which claims priority to Provisional Patent Application No. 60/421,328, entitled "FEEDER LINK CONFIGURATIONS TO SUPPORT LAYERED MODULATION FOR DIGITAL SIGNALS", filed Oct. 25, 2002, by Paul R. Anderson, Joseph Santoru and Ernest C. Chen, and which is a continuation-in-part of application Ser. No. 09/844,401, entitled "LAYERED MODULATION FOR DIGITAL SIGNALS", filed on Apr. 27, 2001, by Ernest C. Chen, now issued as U.S. Pat. No. 7,209,524;

application Ser. No. 10/532,619, entitled "MAXIMIZING POWER AND SPECTRAL EFFICIENCIES FOR LAYERED AND CONVENTIONAL MODULATIONS", filed on Apr. 25, 2005, by Ernest C. Chen, which is a National Phase Application of PCT Application US03/32800, filed Oct. 16, 2003, which claims priority to Provisional Patent Application No. 60/421,288, entitled "MAXIMIZING POWER AND SPECTRAL EFFICIENCIES FOR LAYERED AND CONVENTIONAL MODULATION", filed Oct. 25, 2002, by Ernest C. Chen and which is a continuation-in-part of application Ser. No. 09/844,401, entitled "LAYERED MODULATION FOR DIGITAL SIGNALS", filed on Apr. 27, 2001, by Ernest C. Chen, now issued as U.S. Pat. No. 7,209,524;

application Ser. No. 10/532,524, entitled "AMPLITUDE AND PHASE MATCHING FOR LAYERED MODULATION RECEPTION", filed on Apr. 25, 2005, by Ernest C. Chen, Jeng-Hong Chen, Kenneth Shum, and Joungheon Oh, which is a National Phase Application of PCT Application US03/31199, filed Oct. 3, 2003, which claims priority to Provisional Patent Application No. 60/421,332, entitled "AMPLITUDE AND PHASE MATCHING FOR LAYERED MODULATION RECEPTION", filed Oct. 25, 2002, by Ernest C. Chen, Jeng-Hong Chen, Kenneth Shurn, and Joungheon Oh, and which is a continuation-in-part of application Ser. No. 09/844,401, entitled "LAYERED MODULATION FOR DIGITAL SIGNALS", filed on Apr. 27, 2001, by Ernest C. Chen, now issued as U.S. Pat. No. 7,209,524, and also claims priority to;

application Ser. No. 10/532,582, entitled "METHOD AND APPARATUS FOR TAILORING CARRIER POWER REQUIREMENTS ACCORDING TO AVAILABILITY IN LAYERED MODULATION SYSTEMS", filed on Apr. 25, 2005, by Ernest C. Chen, Paul R. Anderson and Joseph Santorn, now issued as U.S. Pat. No. 7,173,977, which is a National Stage Application of PCT Application US03/32751, filed Oct. 15, 2003, which claims priority to Provisional Patent Application No. 60/421,333, entitled "METHOD AND APPARATUS FOR TAILORING CARRIER POWER REQUIREMENTS ACCORDING TO AVAILABILITY IN LAYERED MODULATION SYSTEMS", filed Oct. 25, 2002, by Ernest C. Chen, Paul R. Anderson and Joseph Santorn, and which is a continuation-in-part of application Ser. No. 09/844,401, entitled "LAYERED MODULATION FOR DIGITAL SIGNALS", filed on Apr. 27, 2001, by Ernest C. Chen, now issued as U.S. Pat. No. 7,209,524;

application Ser. No. 10/532,509, entitled "ESTIMATING THE OPERATING POINT ON A NONLINEAR TRAVELING WAVE TUBE AMPLIFIER", filed on Apr. 25, 2005, by Ernest C. Chen and Sham Maitra, now issued as U.S. Pat. No. 7,230,480, which is a National Stage Application of PCT Application US03/33130 filed Oct. 17, 2003, and which claims priority to Provisional Patent Application No. 60/421,289, entitled "ESTIMATING THE OPERATING POINT ON A NONLINEAR TRAVELING WAVE TUBE AMPLIFIER", filed Oct. 25, 2002, by Ernest C. Chen and Shamik Maitra, and which is a continuation-in-part of application Ser. No. 09/844,401, entitled "LAYERED MODULATION FOR DIGITAL SIGNALS", filed on Apr. 27, 2001, by Ernest C. Chen, now issued as U.S. Pat. No. 7,209,524;

application Ser. No. 10/519,322, entitled "IMPROVING HIERARCHICAL 8PSK PERFORMANCE", filed on Dec. 23, 2004 by Ernest C. Chen and Joseph Santoru, which is a National Stage Application of PCT US03/020,862 filed Jul. 1, 2003, which claims priority to Provisional Patent Application No. 60/392,861, filed Jul. 1, 2002 and Provisional Patent Application No. 60/392,860, filed Jul. 1, 2002, and which is also related to application Ser. No. 09/844,401, entitled "LAYERED MODULATION FOR DIGITAL SIGNALS", filed on Apr. 27, 2001, by Ernest C. Chen, now issued as U.S. Pat. No. 7,209,524;

application Ser. No. 10/519,375, entitled "METHOD AND APPARATUS FOR LAYERED MODULATION", filed on Jul. 3, 2003, by Ernest C. Chen and Joseph Santoru, which is a National Stage Application of PCT US03/20847, filed Jul. 3, 2003, which claims priority to Provisional Patent Application No. 60/393,437 filed Jul. 3, 2002, and which is related to Application Ser. No. 09/844,401, entitled "LAYERED MODULATION FOR DIGITAL SIGNALS", filed on Apr. 27, 2001, by Ernest C. Chen, now issued as U.S. Pat. No. 7,209,524;

application Ser. No. 10/692,539, entitled "ON-LINE PHASE NOISE MEASUREMENT FOR LAYERED MODULATION", filed Oct. 24, 2003, by Ernest C. Chen, which claims priority from Provisional Patent Application No. 60/421,291, filed Oct. 25, 2002, entitled "ON-LINE PHASE NOISE MEASUREMENT FOR LAYERED MODULATION"; and application Ser. No. 10/692,491, entitled "ONLINE OUTPUT MULTIPLEXER FILTER MEASUREMENT", filed on Oct. 24, 2003, by Ernest C. Chen, which claims priority to Provisional Patent Application No. 60/421,290, filed Oct. 25, 2002, and which is a continuation-in-part of application Ser. No. 09/844,401, entitled "LAYERED MODULATION FOR DIGITAL SIGNALS", filed on Apr. 27, 2001, by Ernest C. Chen, now issued as U.S. Pat. No. 7,209,524.

2. Description of the Related Art

Digital signal communication systems have been used in various fields, including digital TV signal transmission, both terrestrial and satellite. As the various digital signal communication systems and services evolve, there is a burgeoning demand for increased data throughput and added services. However, it is more difficult to implement improvement in old systems and new services when it is necessary to replace existing legacy hardware, such as transmitters and receivers. New systems and services are at an advantage when they can utilize existing legacy hardware. In the realm of wireless communications, this principle is further highlighted by the limited availability of electromagnetic spectrum. Thus, it is not possible (or at least not practical) to merely transmit enhanced or additional data at a new frequency.

The conventional method of increasing spectral capacity is to move to a higher-order modulation, such as from quadrature phase shift keying (QPSK) to eight phase shift keying (8PSK) or sixteen quadrature amplitude modulation (16QAM). Unfortunately, QPSK receivers cannot demodulate conventional 8PSK or 16QAM signals. As a result, legacy customers with QPSK receivers must upgrade their receivers in order to continue to receive any signals transmitted utilizing 8PSK or 16QAM modulation.

It is advantageous for systems and methods of transmitting signals to accommodate enhanced and increased data throughput without requiring additional frequency. It is also advantageous for enhanced and increased throughput signals for new receivers to be backwards compatible with legacy receivers. There is further advantage for systems and methods which allow transmission signals to be upgraded from a source separate from the legacy transmitter.

It has been proposed that a layered modulation signal, transmitting non-coherently upper as well as lower layer signals be employed to meet these needs. Such layered modulation systems allow for higher information throughput with backwards compatibility. However, even when backward compatibility is not required (such as with an entirely new system), layered modulation can still be advantageous because it requires a TWTA peak power significantly lower than that for a conventional 8PSK or 16QAM modulation formats for a given throughput.

Equalizers are widely used in communication systems, and are particularly useful when there are multipath and/or other distortion effects in the transmission channel. Equalizers can also be used to cancel "echo" in the system. However, such equalizers typically require apriori knowledge of the channel impulse response, or knowledge of a pre-determined training sequence that is transmitted in the channel. Since the training sequence is known, the channel impulse response can be determined from the training sequence and appropriately equalized. Blind equalizers, which do not have apriori knowledge of the channel impulse response or knowledge of the pre-determined training sequence, are known, but such equalizers typically exhibit poor performance.

Accordingly, there is a need for systems and methods for accurately equalizing communication channels that does not require apriori knowledge of the channel impulse response or a training sequence. The present invention meets this need and provides further advantages as detailed hereafter.

SUMMARY OF THE INVENTION

To address the requirements described above, the present invention discloses a method and apparatus for equalizing digital data signals. The method comprises the steps of demodulating and decoding an input signal having input data to produce a data output, remodulating the data output to produce a training sequence including an idealized input signal, wherein the training sequence is comprised of adjacent symbols in the input data, and generating equalizer parameters from the training sequence. The apparatus comprises a demodulator for demodulating an input signal to produce a data output, a modulator, communicatively coupled to the demodulator, for remodulating the data output to produce a training sequence including an idealized input signal, wherein the training sequence is comprised of adjacent symbols in the input data, and a parameter generation module, communicatively coupled to the modulator for generating equalizer parameters from the training sequence.

BRIEF DESCRIPTION OF THE DRAWINGS

Referring now to the drawings in which like reference numbers represent corresponding parts throughout:

FIG. 3A is a diagram of a representative data stream;

FIG. 3B is a diagram of a representative data packet;

FIGS. 18A and 18B are state transition diagrams depicting alternative embodiments of the present invention;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

In the following description, reference is made to the accompanying drawings which form a part hereof, and which show, by way of illustration, several embodiments of the present invention. It is understood that other embodiments may be utilized and structural changes may be made without departing from the scope of the present invention.

Video Distribution System

Figure 1:
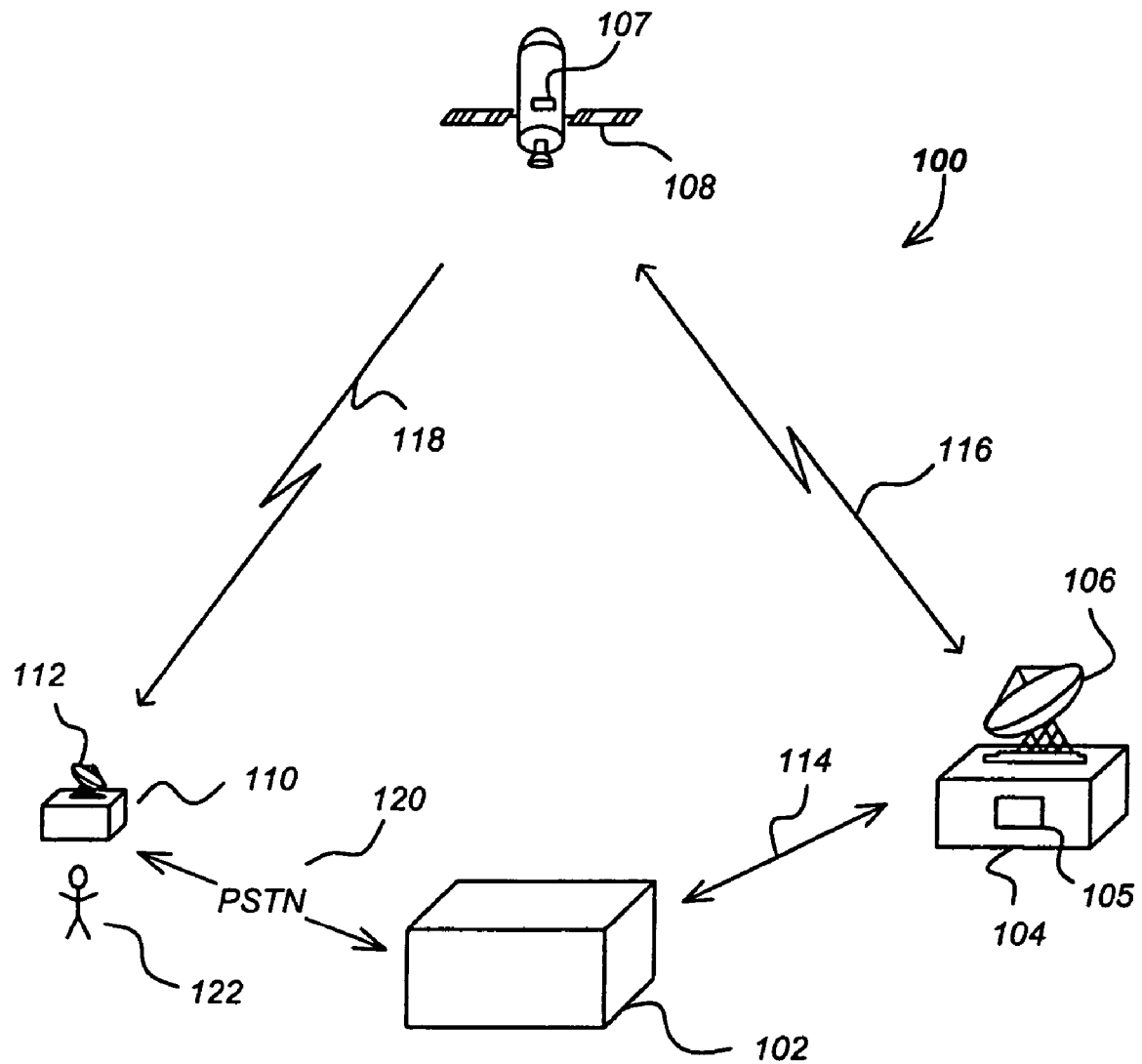
FIG. 1 is a diagram illustrating an overview of a single satellite video distribution system.

FIG. 1 is a diagram illustrating an overview of a single satellite video distribution system 100. The video distribution system 100 comprises a control center 102 in communication with an uplink center 104 via a ground or other link 114 and with a subscriber receiver station 110 via a public switched telephone network (PSTN) or other link 120. The control center 102 provides program material (e.g. video programs, audio programs and other data) to the uplink center 104 and coordinates with the subscriber receiver stations 110 to offer, for example, pay-per-view (PPV) program services, including billing and associated decryption of video programs.

The uplink center 104 receives program material and program control information from the control center 102, and using an uplink antenna 106 and transmitter 105, transmits the program material and program control information to the satellite 108. The satellite receives and processes this information and transmits the video programs and control information to the subscriber receiver station 110 via downlink 118 using transmitter 107. The subscriber receiving station 110 receives this information using the outdoor unit (ODU) 112, which includes a subscriber antenna and a low noise block converter (LNB).

In one embodiment, the subscriber receiving station antenna is an 18-inch slightly oval-shaped Ku-band antenna. The slight ovoid shape is due to the 22.5 degree offset feed of the LNB (low noise block converter) which is used to receive signals reflected from the subscriber antenna. The offset feed positions the LNB out of the way so it does not block any surface area of the antenna minimizing attenuation of the incoming microwave signal.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide such material to the subscriber receiving stations 110. Using data compression and multiplexing techniques with respect to channel capabilities, two satellites 108 working together can receive and broadcast over 150 conventional (non-HDTV) audio and video channels via 32 transponders.

While the invention disclosed herein will be described with reference to a satellite-based video distribution system 100, the present invention may also be utilized with terrestrial-based transmission of program information, whether by broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber 122 is video (and audio) program material such as a movie, the foregoing method can be used to deliver program material comprising purely audio information or other data.

Uplink Configuration

Figure 2:
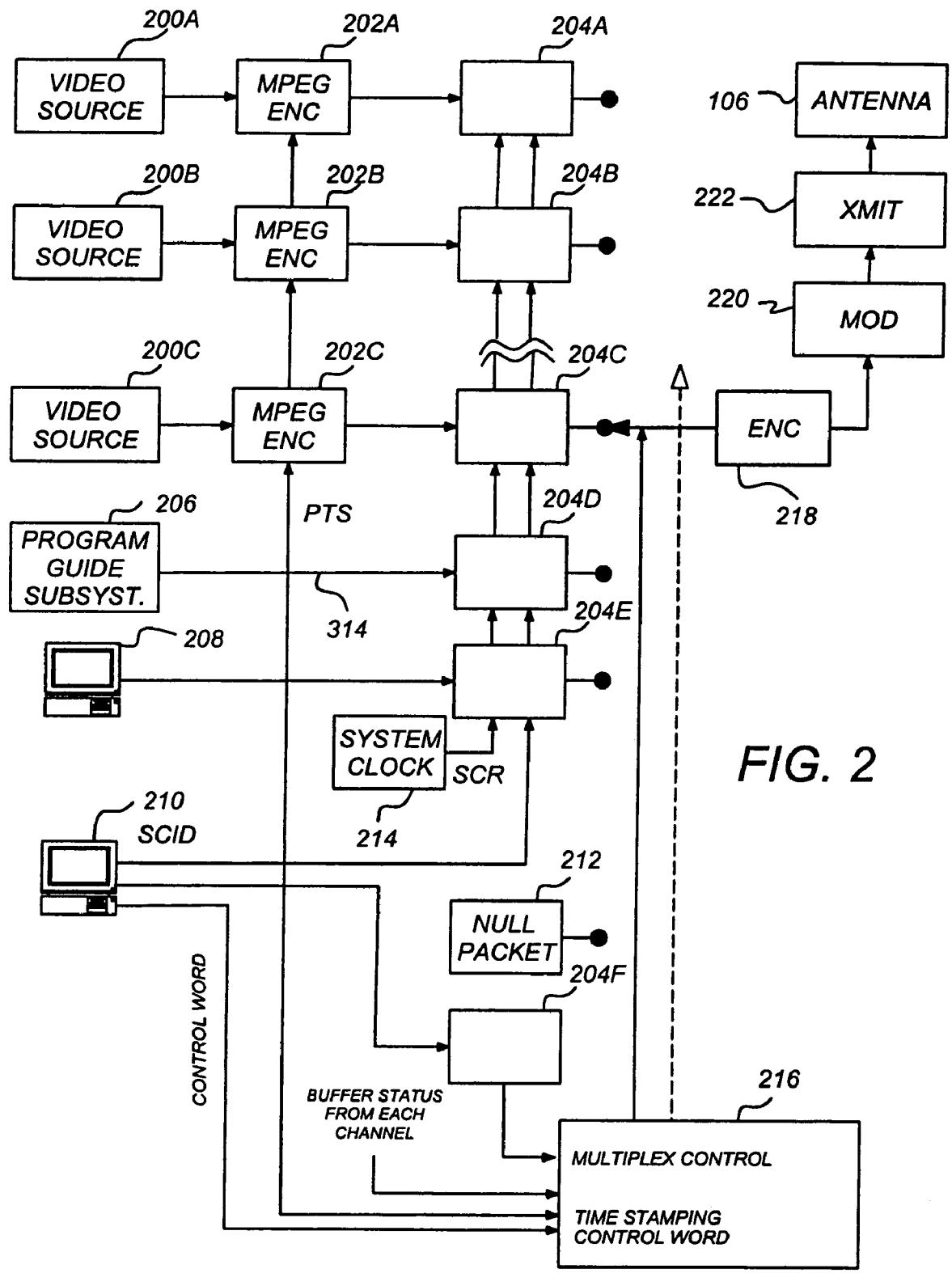
FIG. 2 is a block diagram showing a typical uplink configuration for a single satellite transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), a data channel from a program guide subsystem 206 and computer data information from a computer data source 208.

The video channels are provided by a program source of video material 200A-200C [collectively referred to hereinafter as video source(s) 200]. The data from each video program source 200 is provided to an encoder 202A-202C [collectively referred to hereinafter as encoder(s) 202]. Each of the encoders accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A-204F [collectively referred to hereinafter as packetizer(s) 204] associated with each source 200.

The data packets are assembled using a reference from the system clock 214 (SCR) and from the conditional access manager 210, which provides the SCID to the packetizers 204 for use in generating the data packets. These data packets are then multiplexed into serial data and transmitted.

Broadcast Data Stream Format and Protocol

FIG. 3A is a diagram of a representative data stream. The first packet segment 302 comprises information from video channel 1 (data coming from, for example, the first video program source 200A). The next packet segment 304 comprises computer data information that was obtained, for example from the computer data source 208. The next packet segment 306 comprises information from video channel 5 (from one of the video program sources 200). The next packet segment 308 comprises program guide information such as the information provided by the program guide subsystem 206. As shown in FIG. 3A, null packets 310 created by the null packet module 310 may be inserted into the data stream as desired.

The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106. The receiver 500 receives these signals, and using the SCID, reassembles the packets to regenerate the program material for each of the channels.

FIG. 3B is a diagram of a data packet. Each data packet (e.g. 302-316) is 147 bytes long, and comprises a number of packet segments. The first packet segment 320 comprises two bytes of information containing the SCID and flags. The SCID is a unique 12-bit number that uniquely identifies the data packet's data channel. The flags include 4 bits that are used to control other features. The second packet segment 322 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 324 comprises 127 bytes of payload data, which in the cases of packets 302 or 306 is a portion of the video program provided by the video program source 200. The final packet segment 326 is data required to perform forward error correction.

Figure 4:
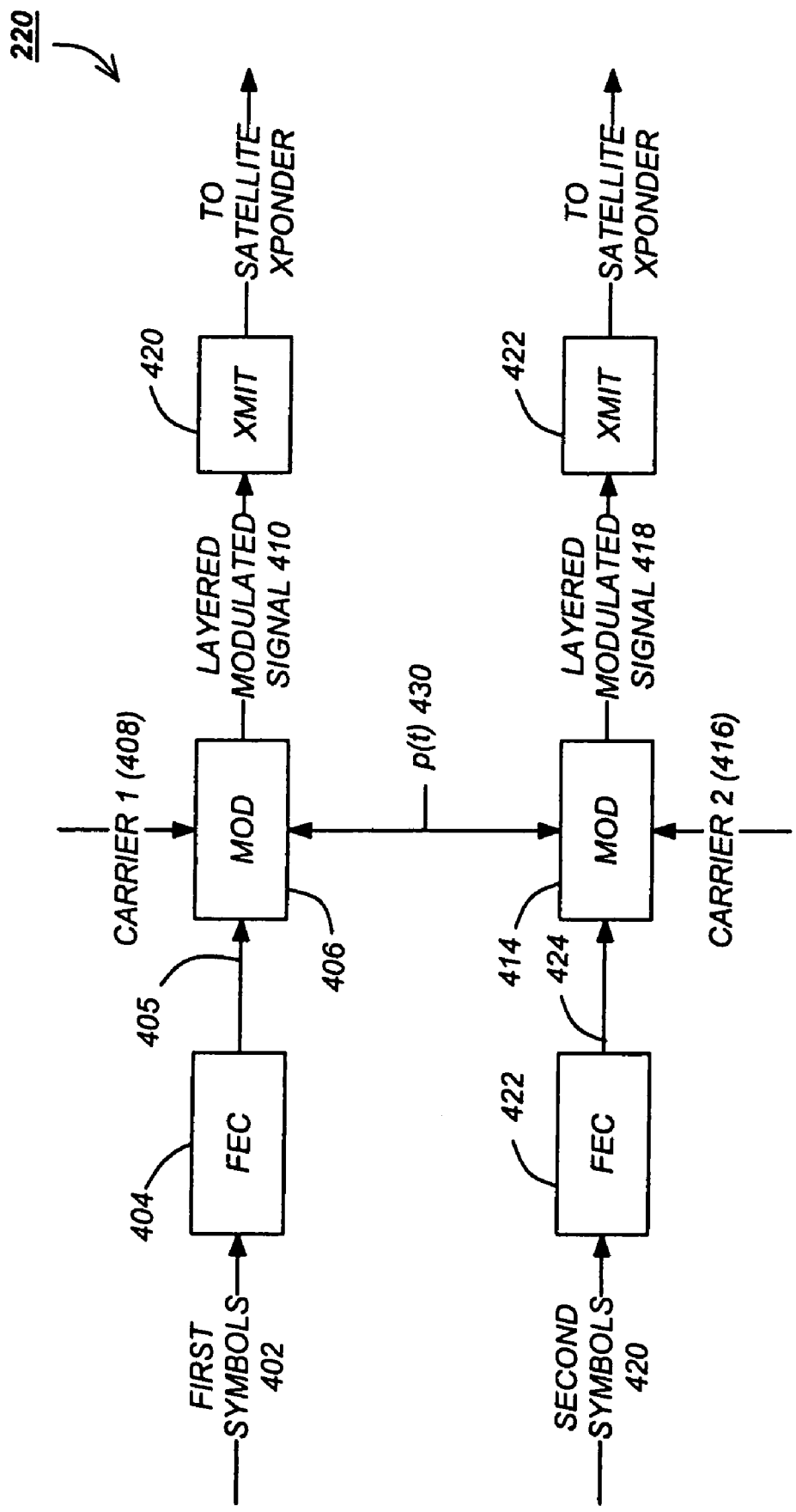
FIG. 4 is a block diagram showing one embodiment of the modulator.

FIG. 4 is a block diagram showing one embodiment of the modulator 220. The modulator 220 optionally comprises a forward error correction (FEC) encoder 404 which accepts the first signal symbols 402 and adds redundant information that are used to reduce transmission errors. The coded symbols 405 are modulated by modulator 406 according to a first carrier 408 to produce an upper layer modulated signal 410. Second symbols 420 are likewise provided to an optional second FEC encoder 422 to produce coded second symbols 424. The coded second symbols 424 are provided to a second modulator 414, which modulates the coded second signals according to a second carrier 416 to produce a lower layer modulated signal 418. The resulting signals are then transmitted by one or more transmitters 420, 422. The upper layer modulated signal 410 and the lower layer modulated signal 418 are therefore uncorrelated, and the frequency range used to transmit each layer can substantially or completely overlap the frequency spectrum used to transmit the other. The upper layer signal 410, however, must be a sufficiently greater amplitude signal than the lower layer signal 418, in order to maintain the signal constellations shown in FIG. 6 and FIG. 7. The modulator 220 may also employ pulse shaping techniques (illustrated by pulse p(t) 430) to account for the limited channel bandwidth. Although FIG. 4 illustrates the same pulse shaping p(t) 430 being applied to both layers, different pulse shaping can be applied to each layer as well.

Integrated Receiver/Decoder

Figure 5:
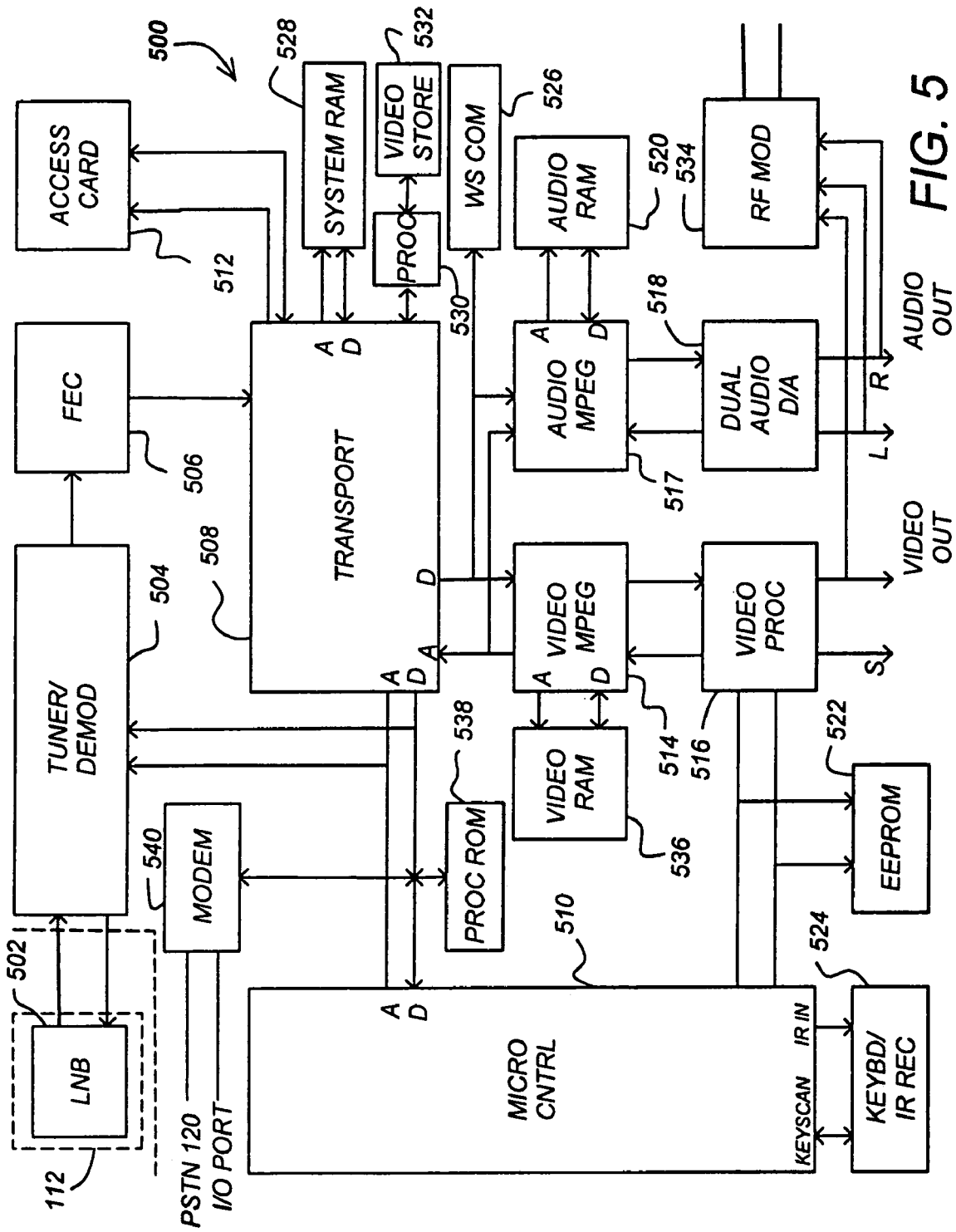
FIG. 5 is a block diagram of an integrated receiver/decoder.

FIG. 5 is a block diagram of an integrated receiver/decoder (IRD) 500 (also hereinafter alternatively referred to as receiver 500). The receiver 500 comprises a tuner/demodulator 504 communicatively coupled to an ODU 112 having one or more LNBs 502. The LNB 502 converts the 12.2- to 12.7 GHz downlink 118 signal from the satellites 108 to, e.g., a 950-1450 MHz signal required by the IRD's 500 tuner/demodulator 504. The LNB 502 may provide either a dual or a single output. The single-output LNB 502 has only one RF connector, while the dual output LNB 502 has two RF output connectors and can be used to feed a second tuner 504, a second receiver 500, or some other form of distribution system.

The tuner/demodulator 504 isolates a single, digitally modulated 24 MHz transponder and converts the modulated data to a digital data stream. Further details regarding the demodulation of the received signal follow.

The digital data stream is then supplied to a forward error correction (FEC) decoder 506. This allows the IRD 500 to reassemble the data transmitted by the uplink center 104 (which applied the forward error correction to the desired signal before transmission to the subscriber receiving station 110) verifying that the correct data signal was received, and correcting errors, if any. The error-corrected data may be fed from the FEC decoder module 506 to the transport module 508 via an 8-bit parallel interface.

The transport module 508 performs many of the data processing functions performed by the IRD 500. The transport module 508 processes data received from the FEC decoder module 506 and provides the processed data to the video MPEG decoder 514 and the audio MPEG decoder 517. In one embodiment of the present invention, the transport module, video MPEG decoder and audio MPEG decoder are all implemented on integrated circuits. This design promotes both space and power efficiency, and increases the security of the functions performed within the transport module 508. The transport module 508 also provides a passage for communications between the microcontroller 510 and the video and audio MPEG decoders 514, 517. As set forth more fully hereinafter, the transport module also works with the conditional access module (CAM) 512 to determine whether the subscriber receiving station 110 is permitted to access certain program material. Data from the transport module can also be supplied to the external communication module 526.

The CAM 512 functions in association with other elements to decode an encrypted signal from the transport module 508. The CAM 512 may also be used for tracking and billing these services. In one embodiment of the present invention, the CAM 512 function as a smart card, having contacts cooperatively interacting with contacts in the IRD 500 to pass information. In order to implement the processing performed in the CAM 512, the IRD 500, and specifically the transport module 508 provides a clock signal to the CAM 512.

Video data is processed by the MPEG video decoder 514. Using the video random access memory (RAM) 536, the MPEG video decoder 514 decodes the compressed video data and sends it to an encoder or video processor 516, which converts the digital video information received from the video MPEG module 514 into an output signal usable by a display or other output device. By way of example, processor 516 may comprise a National TV Standards Committee (NTSC) or Advanced Television Systems Committee (ATSC) encoder. In one embodiment of the invention both S-Video and ordinary video (NTSC or ATSC) signals are provided. Other outputs may also be utilized and are advantageous if high definition programming is processed.

Audio data is likewise decoded by the MPEG audio decoder 517. The decoded audio data may then be sent to a digital-to-analog (D/A) converter 518. In one embodiment of the present invention, the D/A converter 518 is a dual D/A converter, one for the right and left channels. If desired, additional channels can be added for use in surround sound processing or secondary audio programs (SAPs). In one embodiment of the invention, the dual D/A converter 518 itself separates the left and right channel information, as well as any additional channel information. Other audio formats may be similarly supported, for example, multi-channel DOLBY DIGITAL AC-3.

A description of the processes performed in the encoding and decoding of video streams, particularly with respect to MPEG and JPEG encoding/decoding, can be found in Chapter 8 of "Digital Television Fundamentals", by Michael Robin and Michel Poulin, McGraw-Hill, 1998, which is hereby incorporated by reference herein.

The microcontroller 510 receives and processes command signals from the remote control 524, an IRD 500 keyboard interface, and/or another input device. The microcontroller receives commands for performing its operations from a processor programming memory, which permanently stores such instructions for performing such commands. The processor programming memory may comprise a read-only memory (ROM) 538, an electrically erasable programmable read-only memory (EEPROM) 522 or, similar memory device. The microcontroller 510 also controls the other digital devices of the IRD 500 via address and data lines (denoted "A" and "D" respectively, in FIG. 5).

The modem 540 connects to the customer's phone line via the PSTN port 120. It calls, e.g. the program provider, and transmits the customer's purchase information for billing purposes, and/or other information. The modem 540 is controlled by the microprocessor 510. The modem 540 can output data to other I/O port types including standard parallel and serial computer I/O ports.

The present invention also comprises a local storage unit such as the video storage device 532 for storing video and/or audio data obtained from the transport module 508. Video storage device 532 can be a hard disk drive, a read/writable compact disc or DVD, a solid state RAM, or any other storage medium. In one embodiment of the present invention, the video storage device 532 is a hard disk drive with specialized parallel read/write capability so that data may be read from the video storage device 532 and written to the device 532 at the same time. To accomplish this feat, additional buffer memory accessible by the video storage device 532 or its controller may be used. Optionally, a video storage processor 530 can be used to manage the storage and retrieval of the video data from the video storage device 532. The video storage processor 530 may also comprise memory for buffering data passing into and out of the video storage device 532. Alternatively or in combination with the foregoing, a plurality of video storage devices 532 can be used. Also alternatively or in combination with the foregoing, the microcontroller 510 can also perform the operations required to store and/or retrieve video and other data in the video storage device 532.

The video processing module 516 input can be directly supplied as a video output to a viewing device such as a video or computer monitor. In addition, the video and/or audio outputs can be supplied to an RF modulator 534 to produce an RF output and/or 8 vestigial side band (VSB) suitable as an input signal to a conventional television tuner. This allows the receiver 500 to operate with televisions without a video output.

Each of the satellites 108 comprises a transponder, which accepts program information from the uplink center 104, and relays this information to the subscriber receiving station 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective service channel identification (SCID).

Preferably, the IRD 500 also receives and stores a program guide in a memory available to the microcontroller 510. Typically, the program guide is received in one or more data packets in the data stream from the satellite 108. The program guide can be accessed and searched by the execution of suitable operation steps implemented by the microcontroller 510 and stored in the processor ROM 538. The program guide may include data to map viewer channel numbers to satellite transponders and service channel identifications (SCIDs), and also provide TV program listing information to the subscriber 122 identifying program events.

The functionality implemented in the IRD 500 depicted in FIG. 5 can be implemented by one or more hardware modules, one or more software modules defining instructions performed by a processor, or a combination of both.

The present invention provides for the modulation of signals at different power levels and advantageously for the signals to be non-coherent from each layer. In addition, independent modulation and coding of the signals may be performed. Backwards compatibility with legacy receivers, such as a quadrature phase shift keying (QPSK) receiver is enabled and new services are provided to new receivers. A typical new receiver of the present invention uses two demodulators and one remodulator as will be described in detail hereafter.

In a typical backwards-compatible embodiment of the present invention, the legacy QPSK signal is boosted in power to a higher transmission (and reception) level. This creates a power "room" in which a new lower layer signal may operate. The legacy receiver will not be able to distinguish the new lower layer signal, from additive white Gaussian noise, and, thus, operates in the usual manner. The optimum selection of the layer power levels is based on accommodating the legacy equipment, as well as the desired new throughput and services.

The new lower layer signal is provided with a sufficient carrier to thermal noise ratio to function properly. The new lower layer signal and the boosted legacy signal are non-coherent with respect to each other. Therefore, the new lower layer signal can be implemented from a different TWTA and even from a different satellite. The new lower layer signal format is also independent of the legacy format, e.g., it may be QPSK or 8PSK, using the conventional concatenated FEC code or using a new Turbo code. The lower layer signal may even be an analog signal.

The combined layered signal is demodulated and decoded by first demodulating the upper layer to remove the upper carrier. The stabilized layered signal may then have the upper layer FEC decoded and the output upper layer symbols communicated to the upper layer transport. The upper layer symbols are also employed in a remodulator to generate an idealized upper layer signal. The idealized upper layer signal is then subtracted from the stable layered signal to reveal the lower layer signal. The lower layer signal is then demodulated and FEC decoded and communicated to the lower layer transport.

Signals, systems and methods using the present invention may be used to supplement a pre-existing transmission compatible with legacy receiving hardware in a backwards-compatible application or as part of a preplanned layered modulation architecture providing one or more additional layers at a present or at a later date.

Layered Signals

Figure 6B:
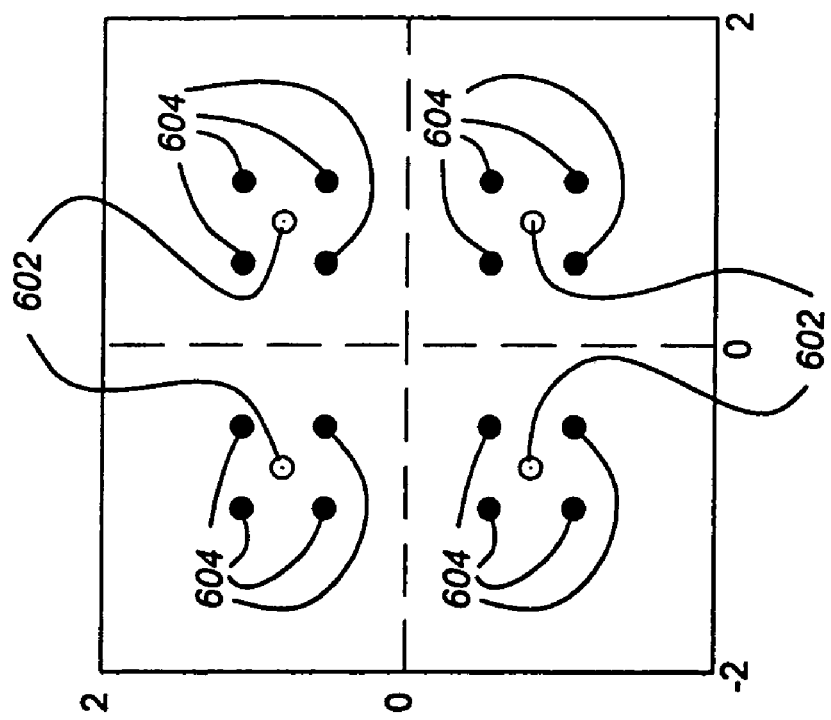
FIGS. 6A-6C are diagrams illustrating the basic relationship of signal layers in a layered modulation transmission.
Figure 6A:
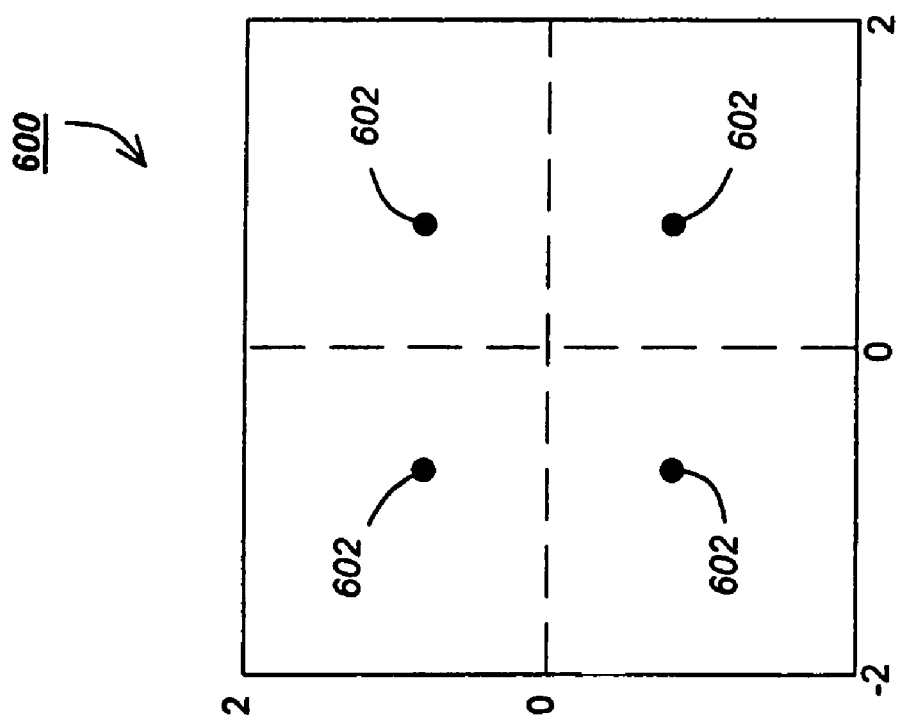
Figure 6C:
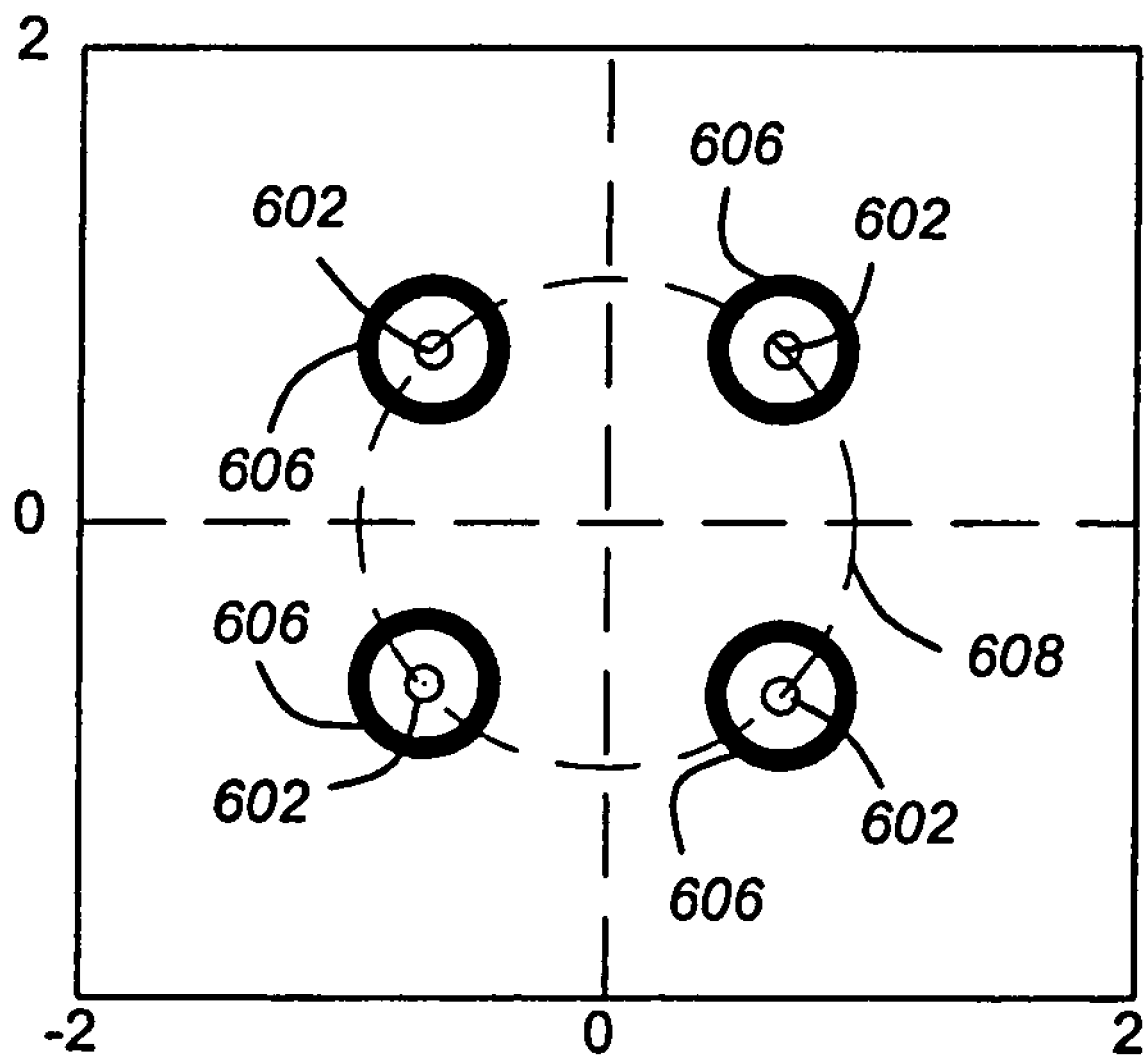

FIGS. 6A-6C illustrate the basic relationship of signal layers in a layered modulation transmission. FIG. 6A illustrates a first layer signal constellation 600 of a transmission signal showing the signal points or symbols 602. FIG. 6B illustrates the second layer signal constellation of symbols 604 over the first layer signal constellation 600 where the layers are coherent. FIG. 6C illustrates a second signal layer 606 of a second transmission layer over the first layer constellation where the layers may be non-coherent. The second layer 606 rotates about the first layer constellation 602 due to the relative modulating frequencies of the two layers in a non-coherent transmission. Both the first and second layers rotate about the origin due to the first layer modulation frequency as described by path 608.

Figure 7B:
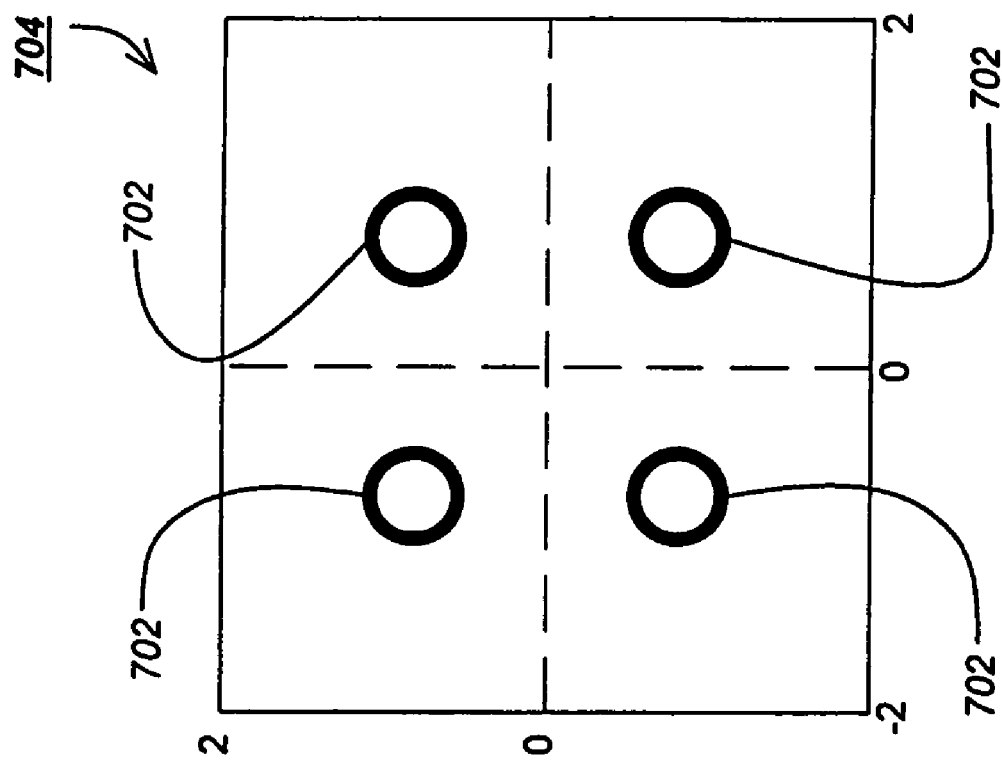
FIGS. 7A-7C are diagrams illustrating a signal constellation of a second transmission layer over the first transmission layer after first layer demodulation.
Figure 7A:
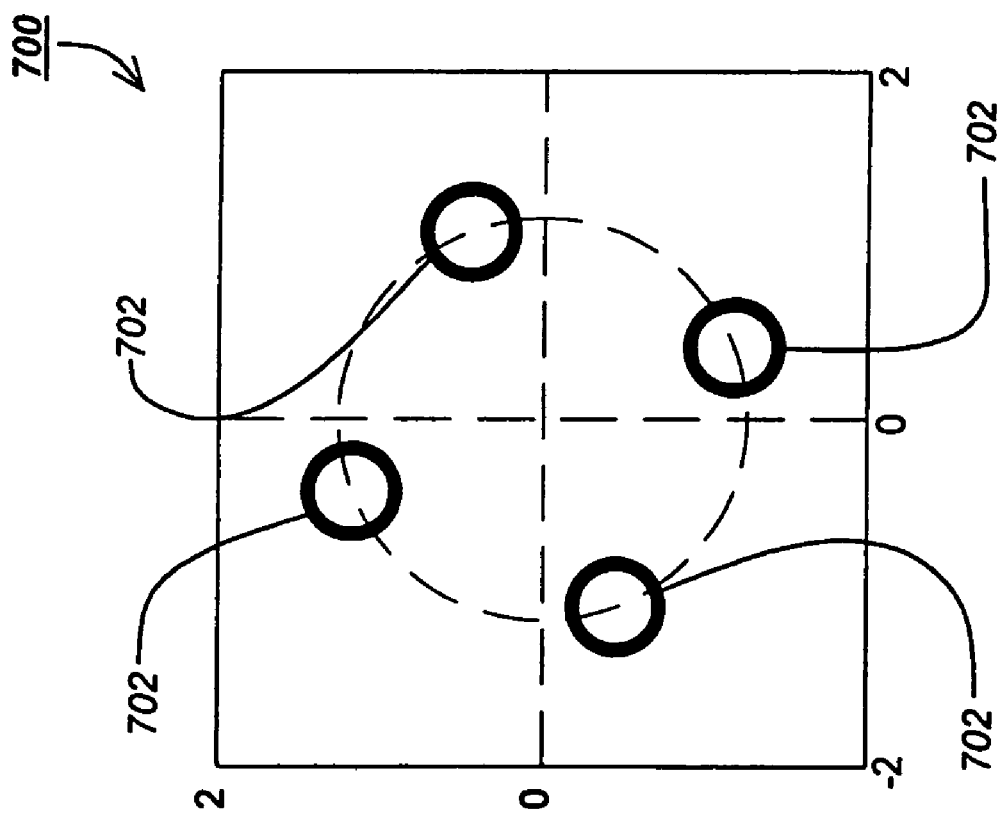
Figure 7C:
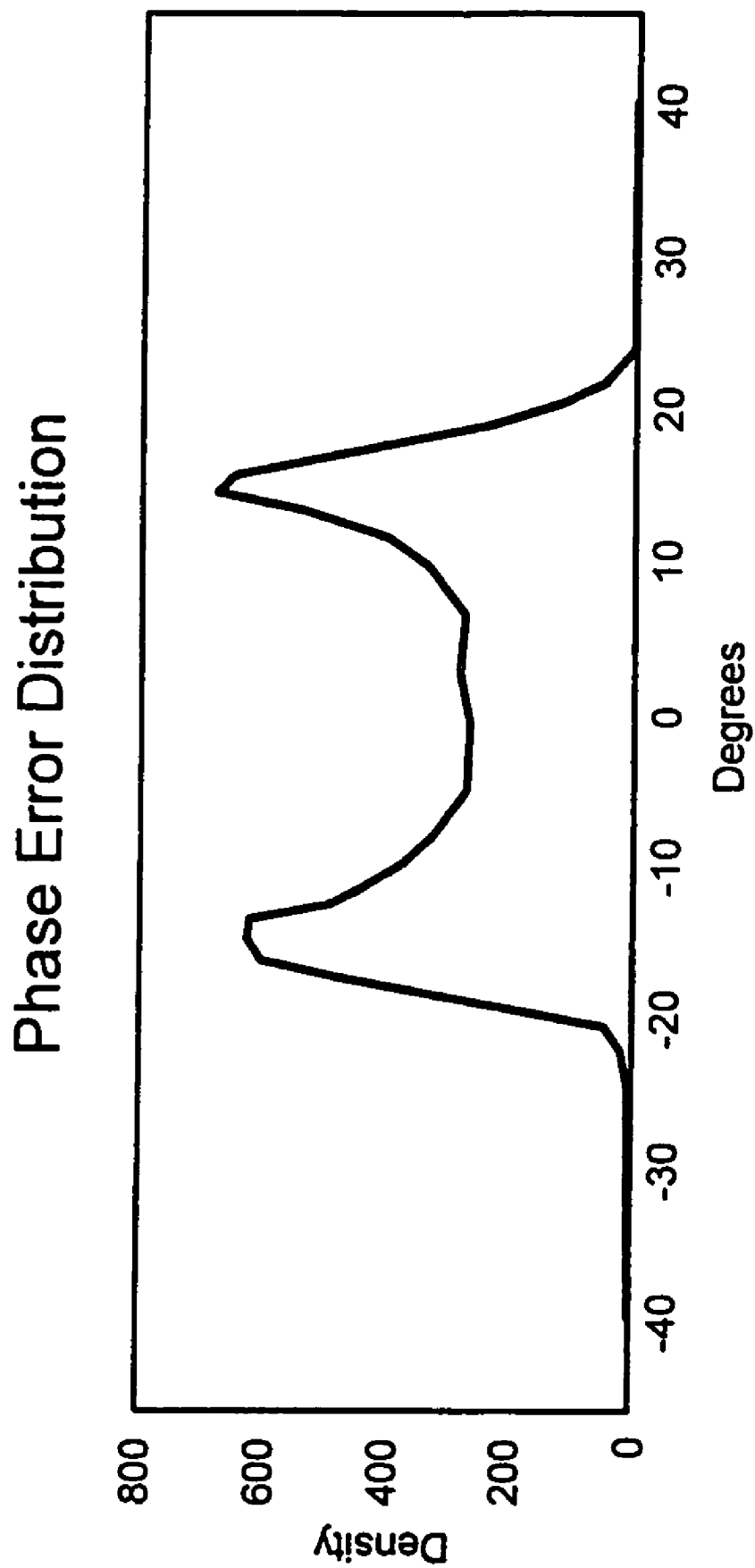

FIGS. 7A-7C are diagrams illustrating a signal constellation of a second transmission layer over the first transmission layer after first layer demodulation. FIG. 7A shows the constellation 700 before the first carrier recovery loop (CRL) and FIG. 7B shows the constellation 704 after CRL. In this case, the signal points of the second layer are actually rings 702. FIG. 7C depicts a phase distribution of the received signal with respect to nodes 602.

Relative modulating frequencies cause the second layer constellation to rotate around the nodes of the first layer constellation. After the second layer CRL, this rotation is eliminated. The radius of the second layer constellation is determined by its power level. The thickness of the rings 702 is determined by the carrier to noise ratio (CNR) of the second layer. As the two layers are non-coherent, the second layer may also be used to transmit analog or digital signals.

Figure 8:
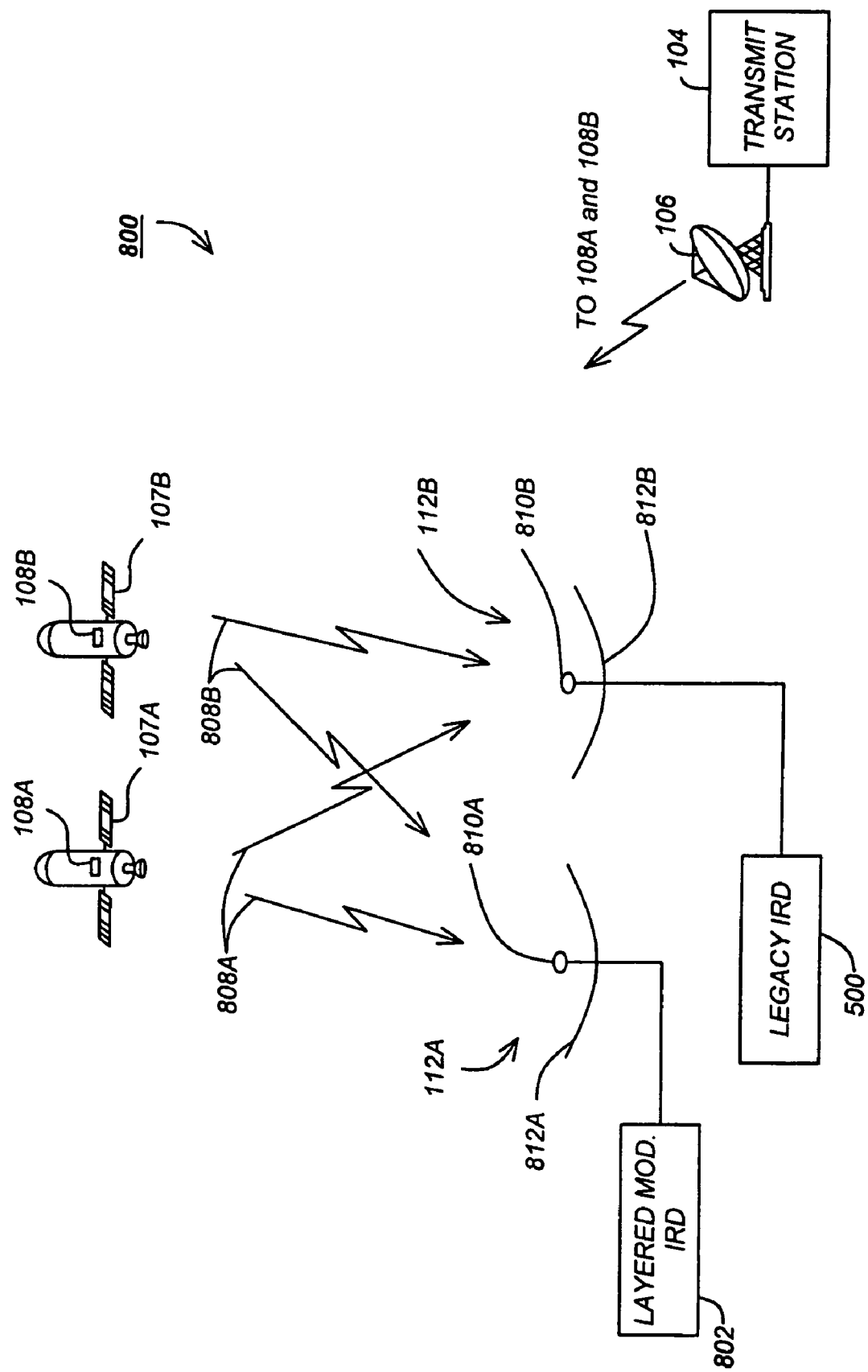
FIG. 8 is a diagram showing a system for transmitting and receiving layered modulation signals.

FIG. 8 is a diagram showing a system for transmitting and receiving layered modulation signals. Separate transmitters 107A, 107B, as may be located on any suitable platform, such as satellites 108A, 108B, are used to non-coherently transmit different layers of a signal of the present invention. Uplink signals are typically transmitted to each satellite 108A, 108B from one or more transmitters 105 via an antenna 106. The layered signals 808A, 808B (downlink signals) are received at receiver antennas 112A, 112B, such as satellite dishes, each with a low noise block (LNB) 812A, 812B where they are then coupled to integrated receiver/decoders (IRDs) 500, 802. Because the signal layers may be transmitted non-coherently, separate transmission layers may be added at any time using different satellites 108A, 108B or other suitable platforms, such as ground based or high altitude platforms. Thus, any composite signal, including new additional signal layers will be backwards compatible with legacy receivers 500, which will disregard the new signal layers. To ensure that the signals do not interfere, the combined signal and noise level for the lower layer must be at or below the allowed noise floor for the upper layer.

Layered modulation applications include backwards compatible and non-backwards compatible applications. "Backwards compatible" in this sense describes systems in which legacy receivers 500 are not rendered obsolete by the additional signal layer(s). Instead, even if the legacy receivers 500 are incapable of decoding the additional signal layer(s), they are capable of receiving the layered modulated signal and decoding the original signal layer. In these applications, the pre-existing system architecture is accommodated by the architecture of the additional signal layers. "Non-backwards compatible" describes a system architecture which makes use of layered modulation, but the modulation scheme employed is such that pre-existing equipment is incapable of receiving and decoding the information on additional signal layer(s).

The pre-existing legacy IRDs 500 decode and make use of data only from the layer (or layers) they were designed to receive, unaffected by the additional layers. However, as will be described hereafter, the legacy signals may be modified to optimally implement the new layers. The present invention may be applied to existing direct satellite services which are broadcast to individual users in order to enable additional features and services with new receivers without adversely affecting legacy receivers and without requiring additional signal frequency.

Demodulator and Decoder

Figure 9:
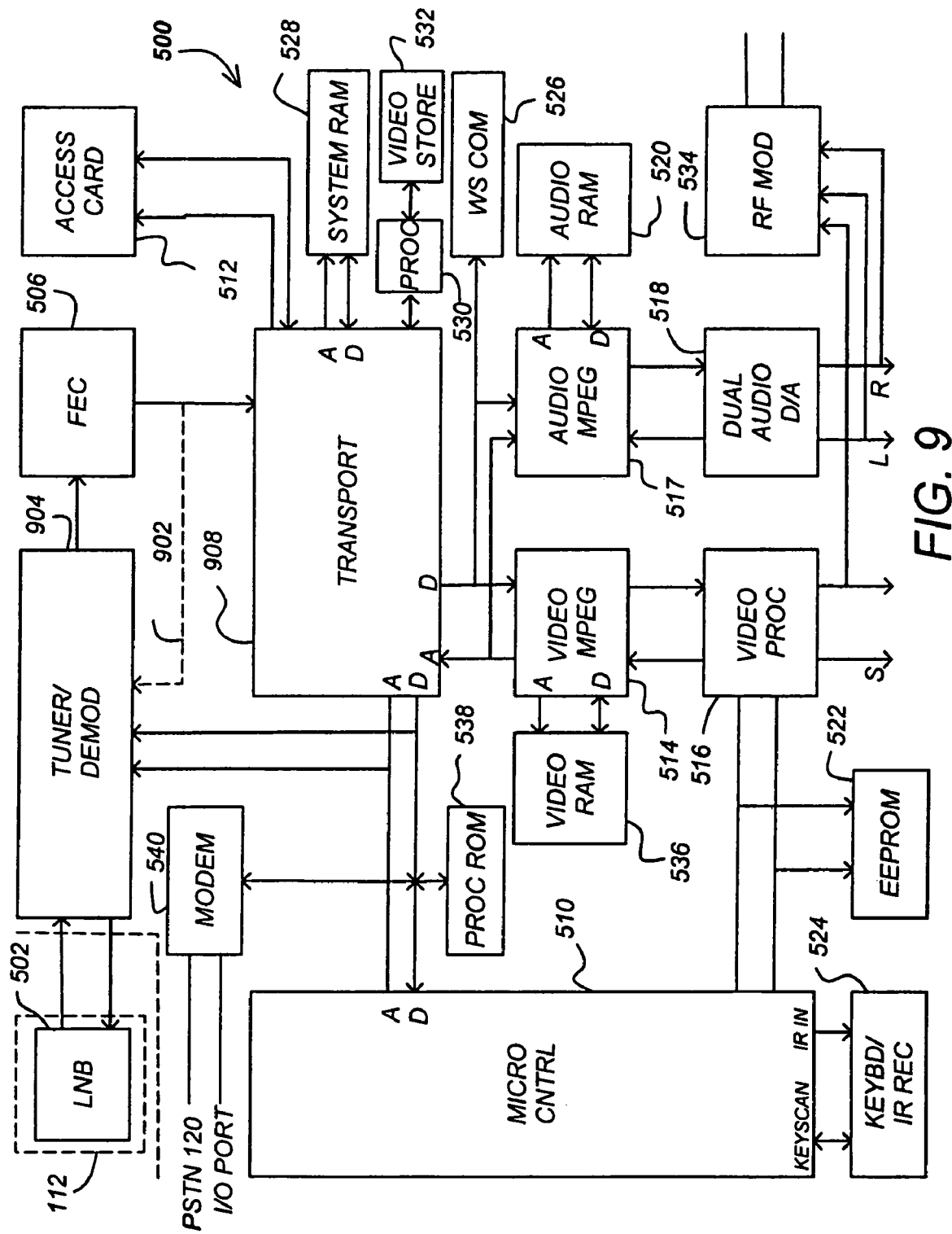
FIG. 9 is a block diagram depicting one embodiment of an enhanced receiver/decoder capable of receiving layered modulation signals.

FIG. 9 is a block diagram depicting one embodiment of an enhanced IRD 802 capable of receiving layered modulation signals. The enhanced IRD 802 includes a feedback path 902 in which the FEC decoded symbols are fed back to a enhanced modified tuner/demodulator 904 and transport module 908.

Figure 10A:
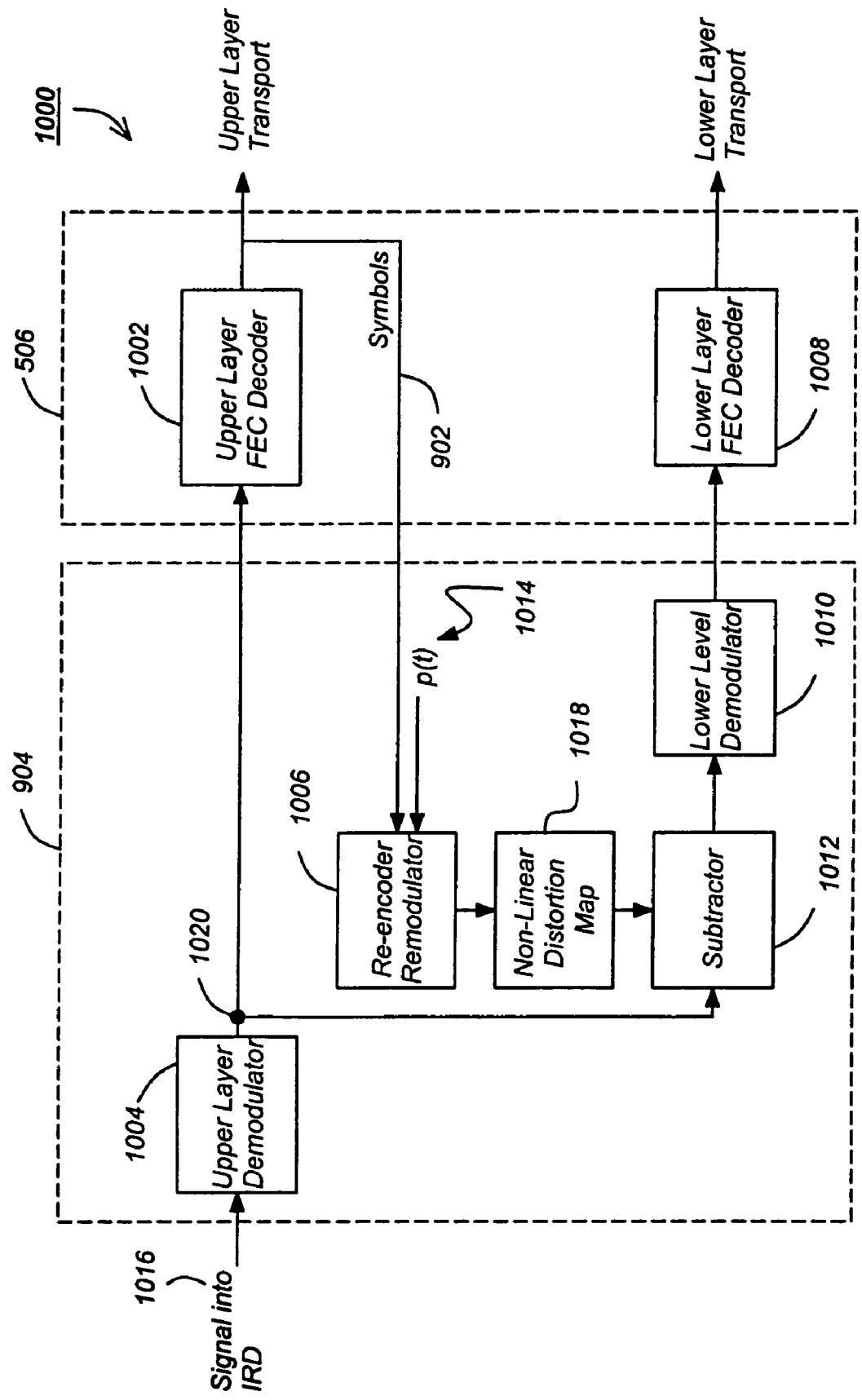
FIG. 10A is a block diagram of one embodiment of the enhanced tuner/modulator and FEC encoder.

FIG. 10A is a block diagram of one embodiment of the enhanced tuner/modulator 904 and FEC encoder 506. FIG. 10A depicts reception where layer subtraction is performed on a signal where the upper carrier has been demodulated. The upper layer of the received combined signal 1016 from the LNB 502, which may contain legacy modulation format, is provided to and processed by an upper layer demodulator 1004 to produce the stable demodulated signal 1020. The demodulated signal 1020 is fed to a communicatively coupled FEC decoder 1002 which decodes the upper layer to produce the upper layer symbols which are output to an upper layer transport. The upper layer symbols are also used to generate an idealized upper layer signal. The upper layer symbols may be produced from the decoder 1002 after Viterbi decode (BER<$10^{-3}$ or so) or after Reed-Solomon (RS) decode (BER<$10^{-9}$ or so), in typical decoding operations known to those skilled in the art. The upper layer symbols are provided via feedback path 902 from the upper layer decoder 1002 to a re-encoder/remodulator 1006 which effectively produces an idealized upper layer signal. The idealized upper level signal is subtracted from the demodulated upper layer signal 1020.

In order for the subtraction to leave a clean small lower layer signal, the upper layer signal must be precisely reproduced. The modulated signal may have been distorted, for example, by traveling wave tube amplifier (TWTA) non-linearity or other non-linear or linear distortions in the transmission channel. The distortion effects are estimated from the received signal after the fact or from TWTA characteristics which may be downloaded into the IRE in AM-AM and/or AM-PM maps 1014, used to eliminate the distortion.

A subtractor 1012 then subtracts the idealized upper layer signal from the stable demodulated signal 1020. This leaves the lower-power second layer signal. The subtractor 1012 may include a buffer or delay function to retain the stable demodulated signal 1020 while the idealized upper layer signal is being constructed. The second layer signal is demodulated by the lower level demodulator 1010 and FEC decoded by decoder 1008 according to its signal format to produce the lower layer symbols, which are provided to the transport module 508.

Figure 10B:
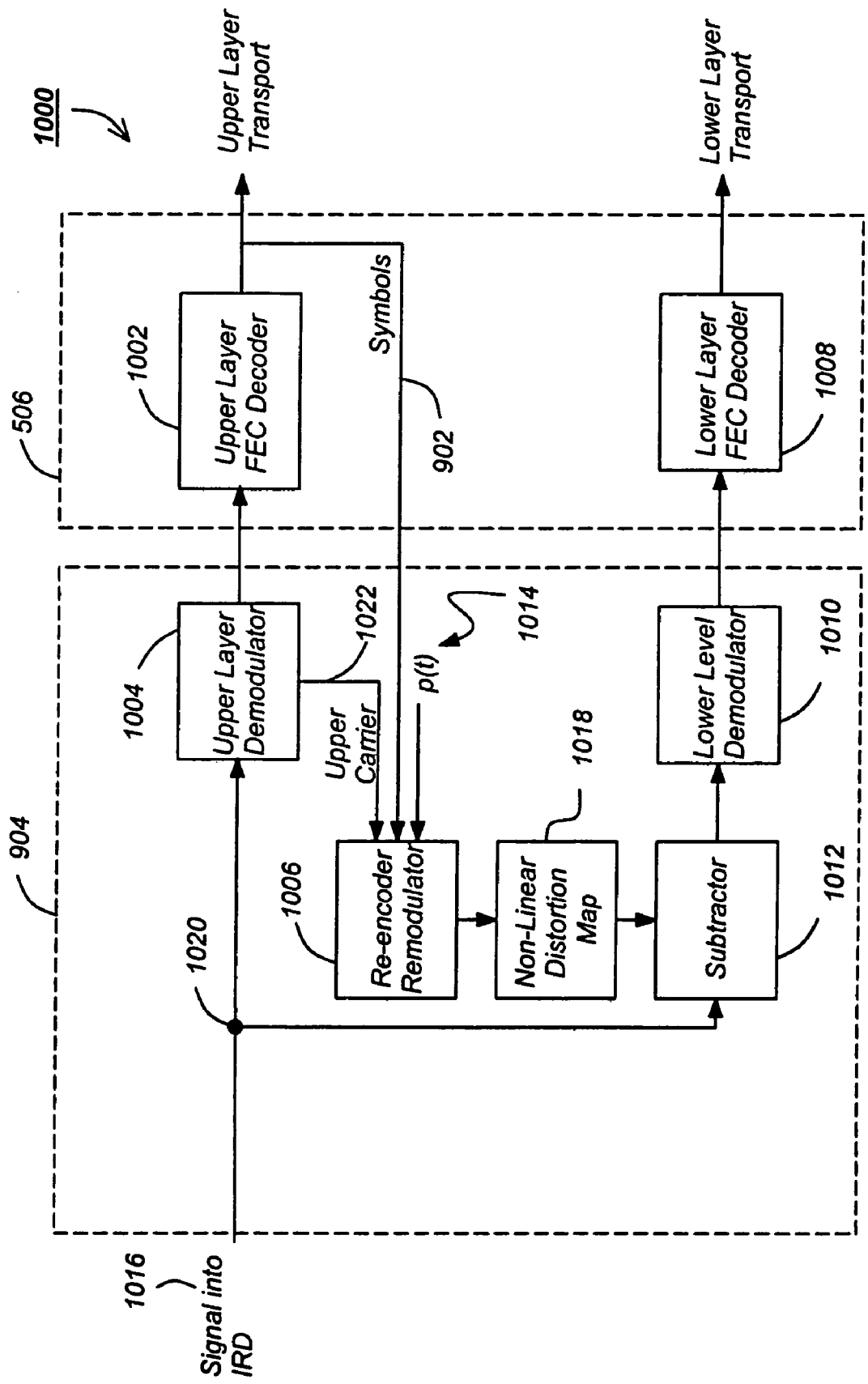
FIG. 10B depicts another embodiment of the enhanced tuner/modulator wherein layer subtraction is performed on the received layered signal.

FIG. 10B depicts another embodiment wherein layer subtraction is performed on the received layered signal. In this case, the upper layer demodulator 1004 produces the upper carrier signal 1022 (as well as the stable demodulated signal output 1020). An upper carrier signal 1022 is provided to the remodulator 1006. The remodulator 1006 provides the remodulated signal to the non-linear distortion mapper 1018 which effectively produces an idealized upper layer signal. Unlike the embodiment shown in FIG. 10A, in this embodiment, the idealized upper layer signal includes the upper layer carrier for subtraction from the received combined signal 416.

Other equivalent methods of layer subtraction will occur to those skilled in the art and the present invention should not be limited to the examples provided here. Furthermore, those skilled in the art will understand that the present invention is not limited to two layers; additional layers may be included. Idealized upper layers are produced through remodulation from their respective layer symbols and subtracted. Subtraction may be performed on either the received combined signal or a demodulated signal. Finally, it is not necessary for all signal layers to be digital transmissions; the lowest layer may be an analog transmission.

The following analysis describes the exemplary two layer demodulation and decoding. It will be apparent to those skilled in the art that additional layers may be demodulated and decoded in a similar manner. The incoming combined signal is represented as:

$$s_{UL}(t) = f_U\left(M_U \exp(j\omega_U t + \theta_U) \sum_{m=-\infty}^{\infty} S_{Um} p(t - mT)\right) + f_L\left(M_L \exp(j\omega_L t + \theta_L) \sum_{m=-\infty}^{\infty} S_{Lm} p(t - mT + \Delta T_m)\right) + n(t)$$

where, $M_U$ is the magnitude of the upper layer QPSK signal and $M_L$ is the magnitude of the lower layer QPSK signal and $M_L \ll M_U$. The signal frequencies and phase for the upper and lower layer signals are respectively $\omega_U$, $\theta_U$ and $\omega_L$, $\theta_L$, respectively. The symbol timing misalignment between the upper and lower layers is $\Delta T_m$. The expression p(t−mT) represents the time shifted version of the pulse shaping filter p(t) 430 employed in signal modulation. QPSK symbols $S_{Um}$ and $S_{Lm}$ are elements of $$\left\{\exp\left(j\frac{n\pi}{2}\right), n = 0, 1, 2, 3\right\} \cdot f_U(\bullet)$$

and $f_L(\bullet)$ denote the distortion function of the TWTAs for the respective signals.

Ignoring $f_U(\bullet)$ and $f_L(\bullet)$ and noise n(t), the following represents the output of the signal after removing the upper carrier:

$$s'_{UL}(t) = M_U \sum_{m=-\infty}^{\infty} S_{Um} p(t - mT) + M_L \exp\{j(\omega_L - \omega_U)t + \theta_L - \theta_U\} \sum_{m=-\infty}^{\infty} S_{Lm} p(t - mT + \Delta T_m)$$

Because of the magnitude difference between $M_U$ and $M_L$, the upper layer decoder 1002 disregards the $M_L$ component of the $s'_{UL}(t)$.

After subtracting the upper layer from $s_{UL}(t)$ in the subtractor 1012, the following remains:

$$s_L(t) = M_L \exp\{j(\omega_L - \omega_U)t + \theta_L - \theta_U\} \sum_{m=-\infty}^{\infty} S_{Lm} p(t - mT + \Delta T_m)$$

Any distortion effects, such as TWTA nonlinearity effects are estimated for signal subtraction. In a typical embodiment of the present invention, the upper and lower layer frequencies are substantially equal. Significant improvements in system efficiency can be obtained by using a frequency offset between layers.

Using the present invention, two-layered backward compatible modulation with QPSK doubles a current 6/7 rate capacity by adding a TWTA approximately 6.2 dB above an existing TWTA power. New QPSK signals may be transmitted from a separate transmitter, for example, from a different satellite. In addition, there is no need for linear traveling wave tube amplifiers (TWTAs) as with 16QAM. Also, no phase error penalty is imposed on higher order modulations such as 8PSK and 16QAM.

Backward Compatible Applications

Figure 11A:
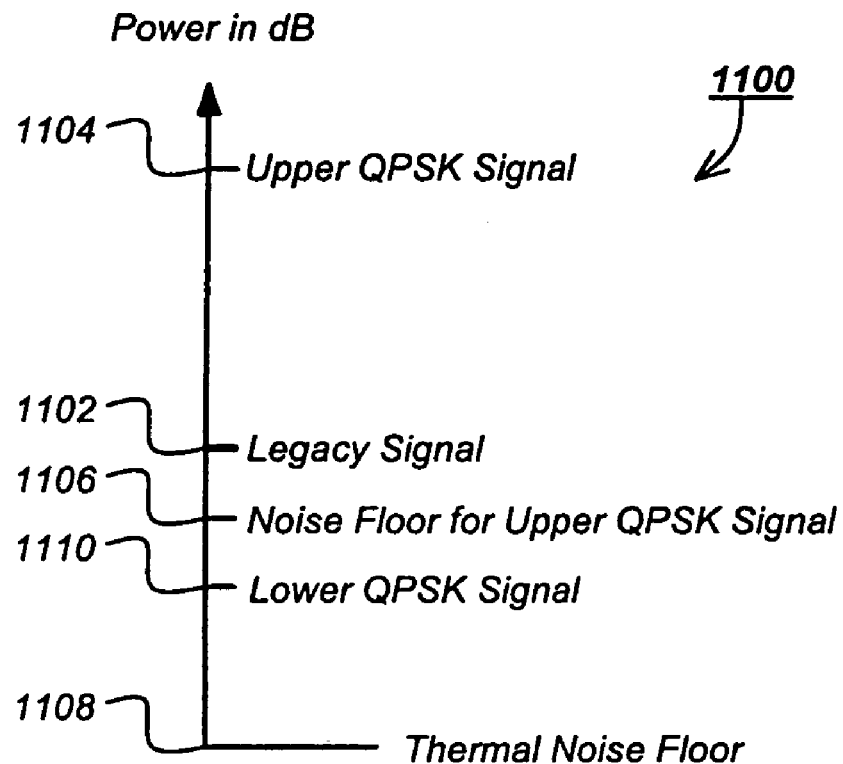
FIGS. 11A and 11B depicts the relative power levels of example embodiments of the present invention.

FIG. 11A depicts the relative power levels 1100 of example embodiments of the present invention. FIG. 11A is not to scale. This embodiment doubles the pre-existing rate 6/7 capacity by using a TWTA 6.2 dB above a pre-existing TWTA equivalent isotropic radiated power (EIRP) and second TWTA 2 dB below the pre-existing TWTA power. This embodiment uses upper and lower QPSK layers which are non-coherent. A code rate of 6/7 is also used for both layers. In this embodiment, the signal of the legacy QPSK signal 1102 is used to generate the upper layer 1104 and a new QPSK layer is the lower layer 1110. The CNR of the legacy QPSK signal 1102 is approximately 7 dB. In the present invention, the legacy QPSK signal 1102 is boosted in power by approximately 6.2 dB bringing the new power level to approximately 13.2 dB as the upper layer 1104. The noise floor 1106 of the upper layer is approximately 6.2 dB. The new lower QPSK layer 1110 has a CNR of approximately 5 dB. The total signal and noise of the lower layer is kept at or below the tolerable noise floor 1106 of the upper layer. The power boosted upper layer 1104 of the present invention is also very robust, making it resistant to rain fade. It should be noted that the invention may be extended to multiple layers with mixed modulations, coding and code rates.

In an alternate embodiment of this backwards compatible application, a code rate of 2/3 may be used for both the upper and lower layers 1104, 1110. In this case, the CNR of the legacy QPSK signal 1102 (with a code rate of 2/3) is approximately 5.8 dB. The legacy signal 1102 is boosted by approximately 5.3 dB to approximately 11.1 dB (4.1 dB above the legacy QPSK signal 1102 with a code rate of 2/3) to form the upper QPSK layer 1104. The new lower QPSK layer 1110 has a CNR of approximately 3.8 dB. The total signal and noise of the lower layer 1110 is kept at or below approximately 5.3 dB, the tolerable noise floor 1106 of the upper QPSK layer. In this case, overall capacity is improved by 1.55 and the effective rate for legacy IRDs will be 7/9 of that before implementing the layered modulation.

In a further embodiment of a backwards compatible application of the present invention, the code rates between the upper and lower layers 1104, 1110 may be mixed. For example, the legacy QPSK signal 1102 may be boosted by approximately 5.3 dB to approximately 12.3 dB with the code rate unchanged at 6/7 to create the upper QPSK layer 1104. The new lower QPSK layer 1110 may use a code rate of 2/3 with a CNR of approximately 3.8 dB. In this case, the total capacity relative to the legacy signal 1102 is approximately 1.78. In addition, the legacy IRDs will suffer no rate decrease.

Non-Backward Compatible Applications

As previously discussed the present invention may also be used in "non-backward compatible" applications. In a first exemplary embodiment, two QPSK layers 1104, 1110 are used each at a code rate of 2/3. The upper QPSK layer 504 has a CNR of approximately 4.1 dB above its noise floor 1106 and the lower QPSK layer 1110 also has a CNR of approximately 4.1 dB. The total code and noise level of the lower QPSK layer 1110 is approximately 5.5 dB. The total CNR for the upper QPSK signal 1104 is approximately 9.4 dB, merely 2.4 dB above the legacy QPSK signal rate 6/7. The capacity is approximately 1.74 compared to the legacy rate 6/7.

Figure 11B:
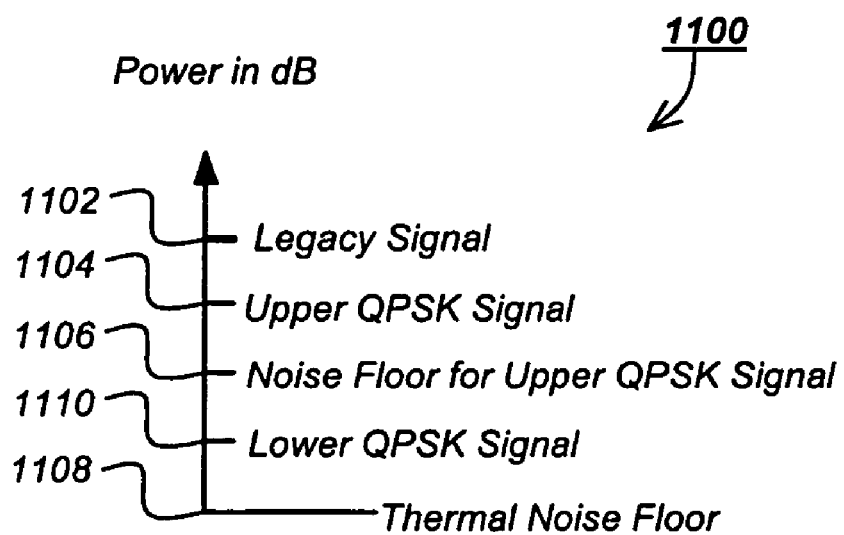

FIG. 11B depicts the relative power levels of an alternate embodiment wherein both the upper and lower layers 1104, 1110 are below the legacy signal level 1102. The two QPSK layers 1104, 1110 use a code rate of 1/2. In this case, the upper QPSK layer 1104 is approximately 2.0 dB above its noise floor 1106 of approximately 4.1 dB. The lower QPSK layer has a CNR of approximately 2.0 dB and a total code and noise level at or below 4.1 dB. The capacity of this embodiment is approximately 1.31 compared to the legacy rate 6/7.

"Unblind" Equalization

The performance of the IRD 500 can be improved by the use of equalizers. Equalizers can be classified into two groups: those that either know or estimate channel impulse response, and those that operate without such knowledge. Information about such equalizers can be found in the paper "Adaptive Equalizer" by Qureshi, Proceedings of IEEE, Vol. 73, No. 9, September 1985, and in the textbook "Digital Communications, " by John G. Proakis, Third Edition, McGraw-Hill Book Company, 1995, in Chapters 10 and 11.

The first group includes equalizers that have a priori knowledge of the channel impulse response, and those that estimate the channel impulse response using prearranged training sequences known to both the transmitter and the receiver. The second group includes blind equalizers (which have no knowledge of the channel impulse response and do not attempt to estimate it). One type of blind equalizer is a decision feedback blind equalizer, which uses the digital output of the system to feedback to the equalizer computation. However, that type of decision-making process is very sensitive to the digital output error rate.

The "unblind" equalizer described below does not fall neatly into any of the above categories. Unlike the first category, no a priori knowledge of the transmission channel characteristics is required and prearranged training sequences are not required, thus saving valuable transmission capacity. The "unblind" equalizer has the same implementation advantages and provides performance better than a blind equalizer. However, the unblind equalizer does not require specific knowledge of the channel impulse response, nor does it need to dedicate transmission capacity to transmit training sequences. The unblind equalizer uses past received data to recover the transmission signal, and then uses the recovered transmission signal to define the equalizer format and parameters.

The unblind equalizer can also be used in combination with an adaptive equalizer to create an adaptive unblind equalizer, which can be used in applications where channel characteristics change over time.

Figure 12A:
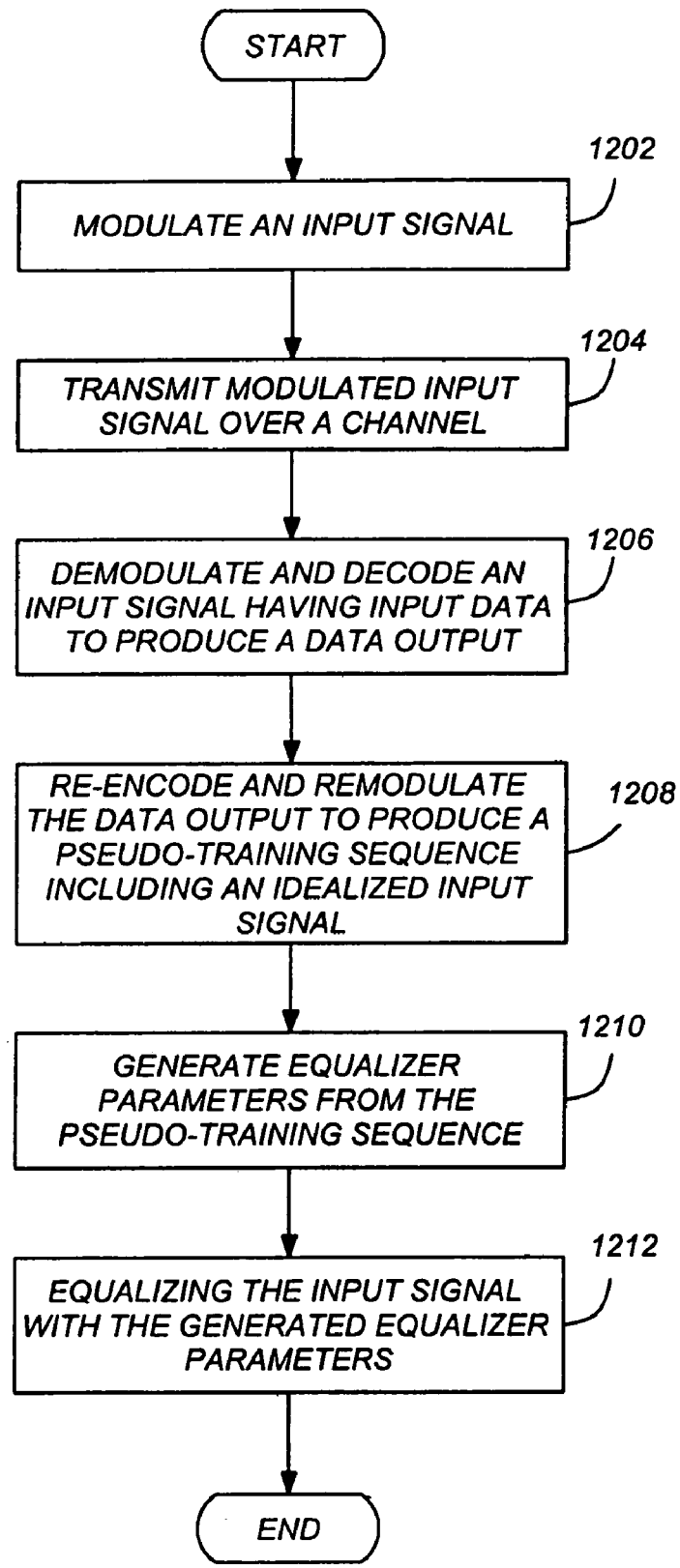
FIGS. 12A and 12B are diagram illustrating the application of unblind equalization techniques.
Figure 12B:
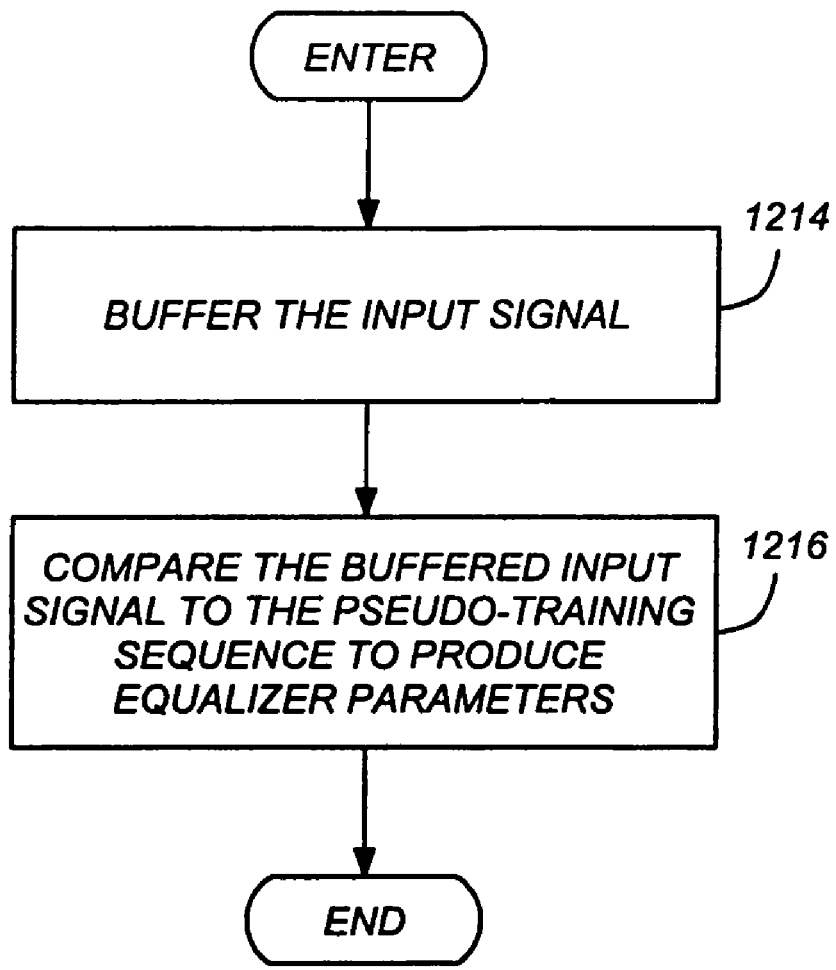

FIGS. 12A and 12B illustrate the application of unblind equalization techniques to a conventional single-layered signal. FIGS. 12A and 12B will be discussed with reference to FIG. 13, which presents an exemplary implementation of an unblind equalizer system.

Turning first to FIG. 12A, an input signal having input data is modulated to produce a modulated input signal, as shown in block 1202. The signal is also typically encoded with an FEC encoder such as a turbo encoder. This can be accomplished, for example, by the modulator/encoder 1302. The modulated signal s(t) is transmitted via channel 1304, producing signal y(t) as shown in block 1204. The signal y(t) is equalized by equalizer 1306, producing an equalized input signal ŝ(t). The equalized input signal ŝ(t) is demodulated (and decoded if was encoded) to produce data output, as described in block 1206. This can be performed, for example, by the demodulator/decoder 1308 shown in FIG. 13. The data output is remodulated to produce a pseudo-training sequence that includes an idealized input signal, as is shown in block 1208. This can be accomplished by means of the remodulator 1310. Since there is a time delay associated with this process, the resulting remodulated signal (and pseudo-training sequence) is represented as $\bar{s}(t-\tau)$. Next, equalizer parameters are derived from the pseudo-training sequence, as shown in block 1210. This can be accomplished by the parameter generation/update module 1314. Next, as shown in block 1212, the input signal y(t) is equalized using the generated parameters. This can be performed by the equalizer 1306 shown in FIG. 13.

In one embodiment, the equalizer parameters are generated by comparing a buffered or delayed version of the input signal with the pseudo-training sequence. This technique is illustrated in blocks 1214 and 1216 of FIG. 12B.

Figure 13:
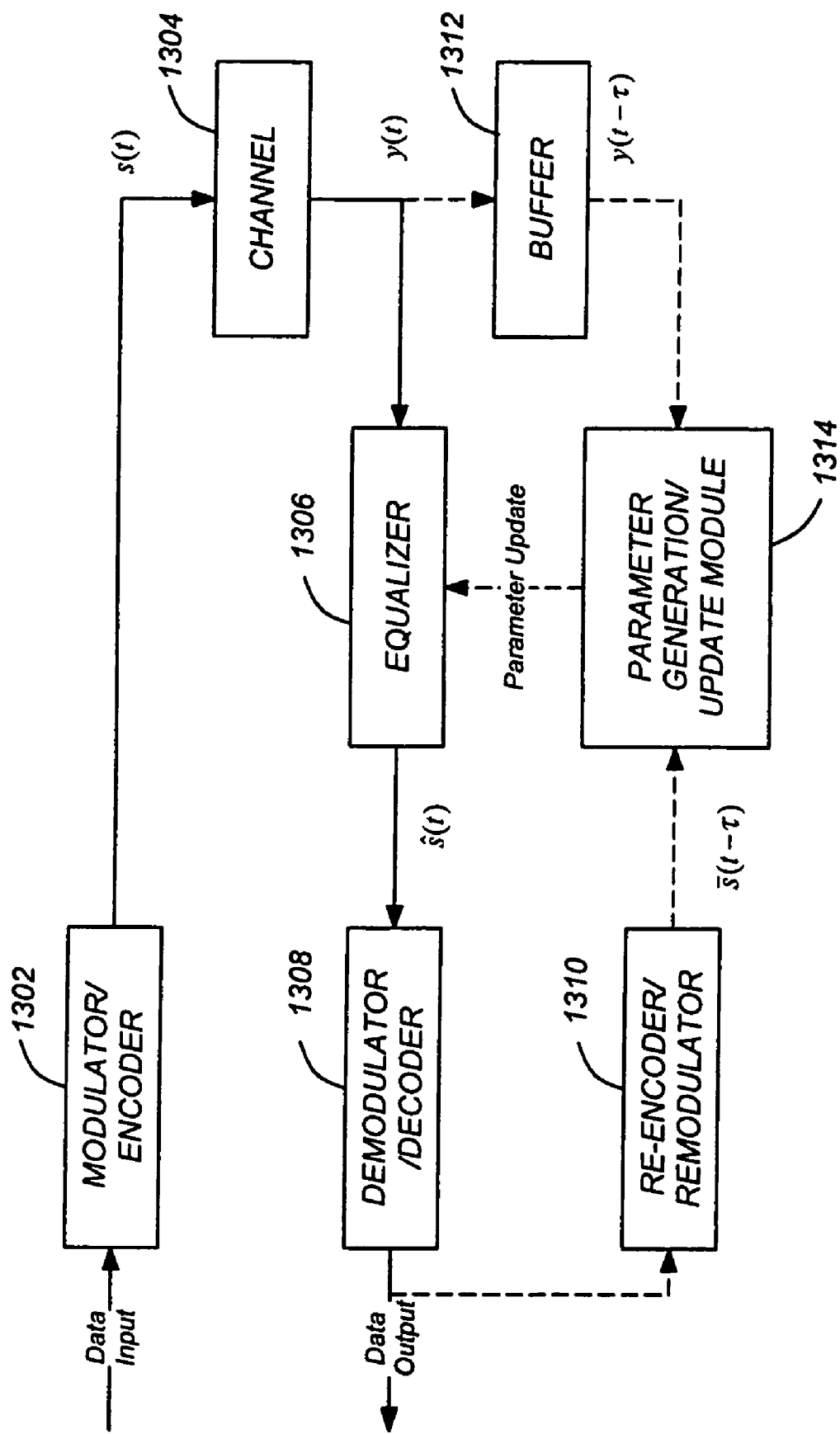
FIG. 13 presents an exemplary implementation of an unblind equalizer system.
Figure 14:
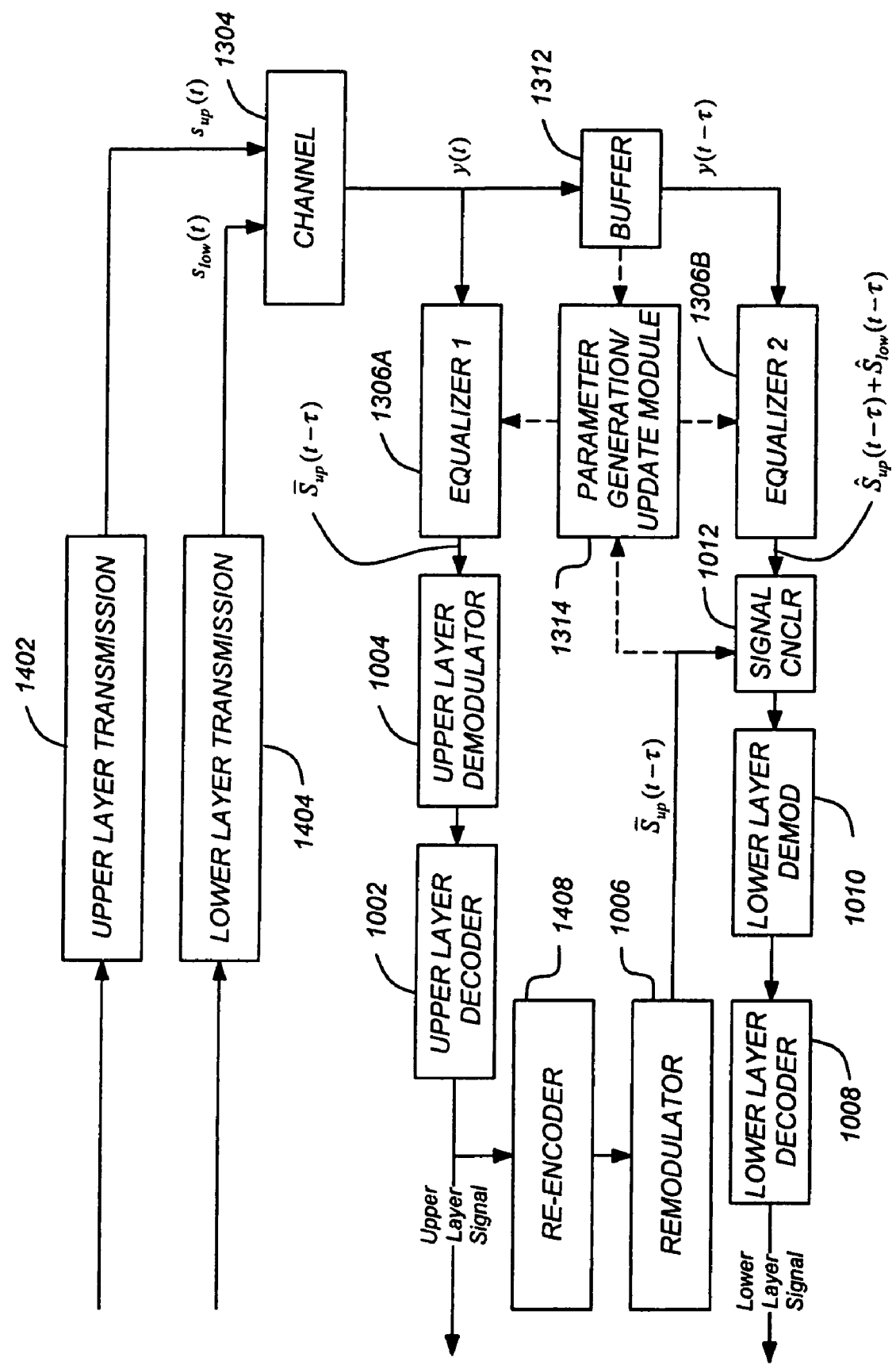
FIG. 14 is a diagram illustrating the embodiment shown in FIG. 13, as it can be applied to a layered modulation system such as is illustrated in FIGS. 10A and 10B.

FIG. 14 further illustrates the embodiment shown in FIG. 13, as it can be applied to a layered modulation system as is illustrated in FIGS. 10A and 10B. Blocks 1402 and 1404 illustrate the modulation and transmission of the upper layer signal $s_{up}(t)$ and the lower layer signal $s_{low}(t)$, respectively, through channel 1304 to produce signal y(t) (which is equal to $S_{up}(t)+S_{low}(t)$. Signal y(t) is applied to a first equalizer 1306A to produce an equalized upper layer signal $\bar{S}_{up}(t-\tau)$. The equalized upper layer signal $\bar{S}_{up}(t-\tau)$ is applied to an upper layer demodulator 1004 and an upper layer decoder 1002 to produce the upper layer signal. The upper layer signal is recoded by re-encoder 1408 and remodulated by modulator 1006 to produce a pseudo-training sequence $\bar{S}_{up}(t-\tau)$. The pseudo-training sequence $\bar{S}_{up}(t-\tau)$ is an idealized version of the upper layer signal, delayed by processing delays inherent in the recoding and remodulating process. The signal $\overline{S}_{up}(t-\tau)$ is provided to a signal canceller 1012.

Signal y(t) is delayed by a time period $\tau$ approximating that of the remodulation and recoding process by buffer 1312 to produce y(t–$\tau$). This delayed signal y(t–$\tau$) is applied to both the parameter generation/update module 1314 and a second equalizer 1306B. The equalized y(t) signal, $\hat{S}_{up}(t)+\hat{S}_{low}(t)$, is provided to the signal canceller 1012 as well. Hence, the output of the signal canceller 1012 is $\overline{S}_{up}(t-\tau)-[\hat{S}_{up}(t-\tau)+\hat{S}_{low}(t-\tau)]$. After accounting for channel transmission non-linearity, $\overline{S}_{up}(t-\tau)$ is approximately equal to $\hat{S}_{up}(t-\tau)$; thus, the output of the signal canceller 1012 can be represented as a delayed and equalized version of the lower layer signal, or $\hat{S}_{low}(t-\tau)$. This signal is provided to the lower layer demodulator 1010 and the lower layer encoder 1008 to reconstruct the lower layer signal. The parameters of the upper layer equalizer 1306A and the lower layer equalizer 1306B are updated with equalizer parameters generated or updated in the parameter generation/update module 1314 using the buffered input signal y(t–$\tau$) or $S_{up}(t-\tau)+S_{low}(t-\tau)$ and the pseudo-training sequence $\overline{S}_{up}(t-\tau)$.

To an extent, the foregoing technique assumes that the transmission channel is, in a wide-sense, stationary, or has characteristics that vary slowly over time, at least as compared to the digital detection process of the receiver 500. The effectiveness of the foregoing technique is reduced in situations where channel variances over time are not smaller than those of the equalizer parameter update. The foregoing technique also assumes that even without equalization, the receiver can detect the transmitted digital information or a portion thereof at a certain range of data error rate. This may not be the case when this "unblind" equalization technique is combined for use with traditional training sequence equalizers or blind equalizers.

Figure 15A:
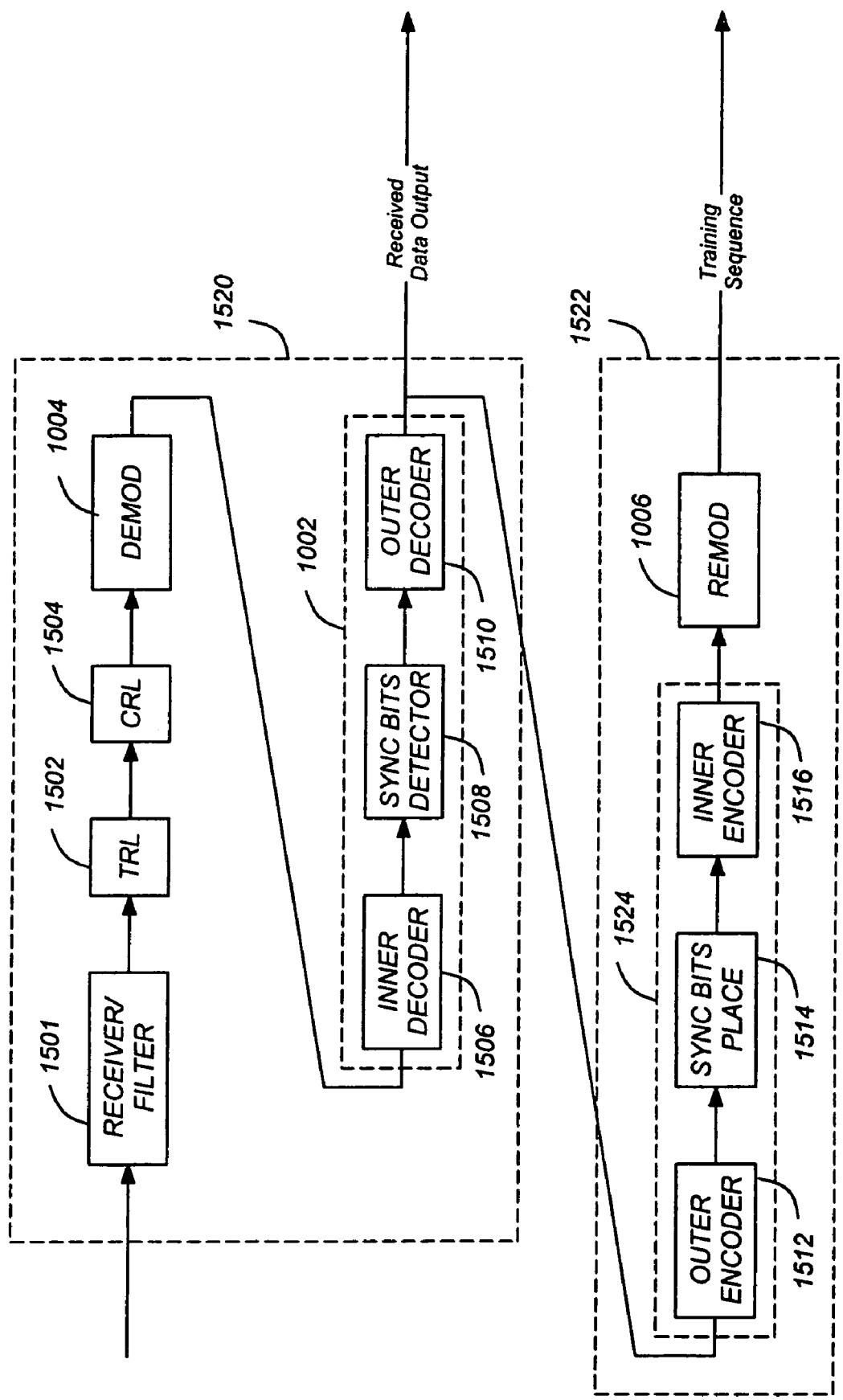
FIGS. 15A and 15B are diagrams depicting further detail regarding the generation of a pseudo-training sequence.
Figure 15B:
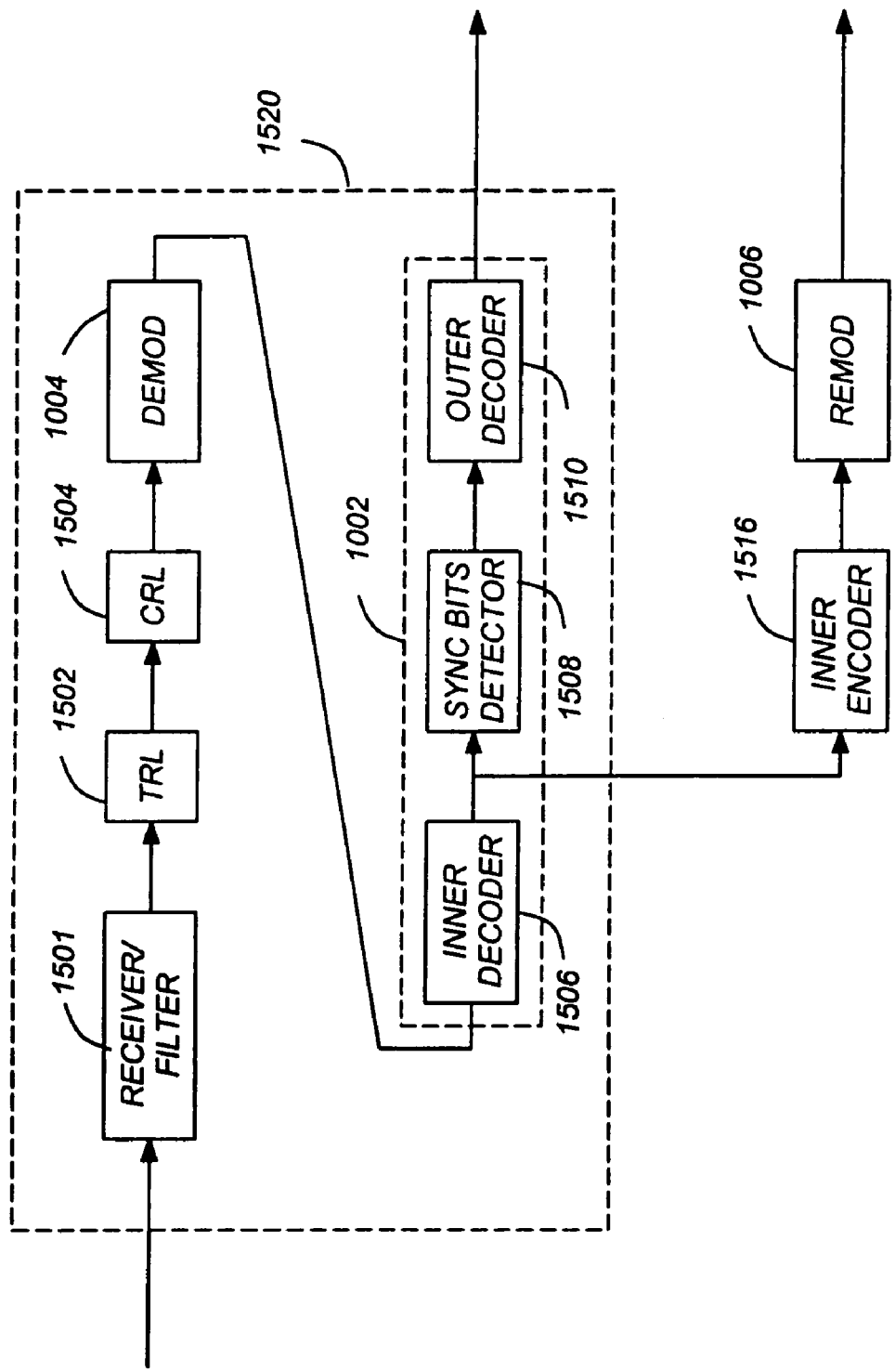

FIGS. 15A and 15B depict further detail regarding the generation of a pseudo-training sequence. The process includes a receiving process 1520 and a remodulation process 1522. The receiving process 1520 is shared with the ordinary data receiving process and is performed by a filter 1501, timing recovery loop (TRL) module 1502, a carrier recovery loop (CRL) module 1504, and a demodulator 1004 and a decoder 1002. The decoder 1002 includes an inner decoder 1506, a synchronization bit detector module 1508 and an outer decoder 1510. The output of the receiving process is a received data output. The received data output is provided to an encoder 1524, which includes an outer encoder 1512, synchronization module 1514 for placing synchronization bits in the data stream, and an inner encoder 1516. The resulting signal is modulated by remodulator 1006 and may optionally be filtered by a front end filter to produce the training sequence.

A determination may be made as to whether the unblinded pseudo-training sequence is usable to create an equalizer parameter update. For example, at any point in the system shown in FIG. 15A, a bit error rate (BER) of these intermediary processes may be determined and compared to the received data output. For example, by using Bose, Chaudhuri, and Hocquenghem (BCH) and Reed-Solomon (RS) codes, the error rate can be estimated by means of the syndrome calculation during the process. For all other block coding, it is possible to encode the decoded vector and thereby estimate the error rate. For convolutional decoding, the error rate may be estimated by computing the moving average of the metric calculation. In addition to the availability of channel decoding to estimate the error rate, some communication systems have synchronization bits in place to align the received data. With such systems, one can directly use the synchronization bit error rate to estimate the entire data transmission rate.

When the received data rate reaches a certain performance level, an unblinded pseudo-training sequence can be used to process the parameter update computation. The point at which there is sufficient channel performance (as measured, for example, by the BER) to generate a pseudo-training sequence varies from system to system, and largely depends upon the value of other communication system parameters.

FIG. 15B illustrates an embodiment in which the generation of the pseudo-training sequence from the transmitted data is foreshortened. FIG. 15B differs FIG. 15A in that the process does not use a complete version of the remodulation process. The remodulation starts with the output of the inner decoder 1506. This results in a simpler remodulation process and shortened time required to generate the unblinded pseudo-training sequence over that of the system illustrated in FIG. 15A. However, this embodiment may yield a higher symbol error rate for an unblinded pseudo-training sequence.

FIGS. 13 and 14 illustrate an unblind equalization architecture that produces independent measurements over time.

Figure 16:
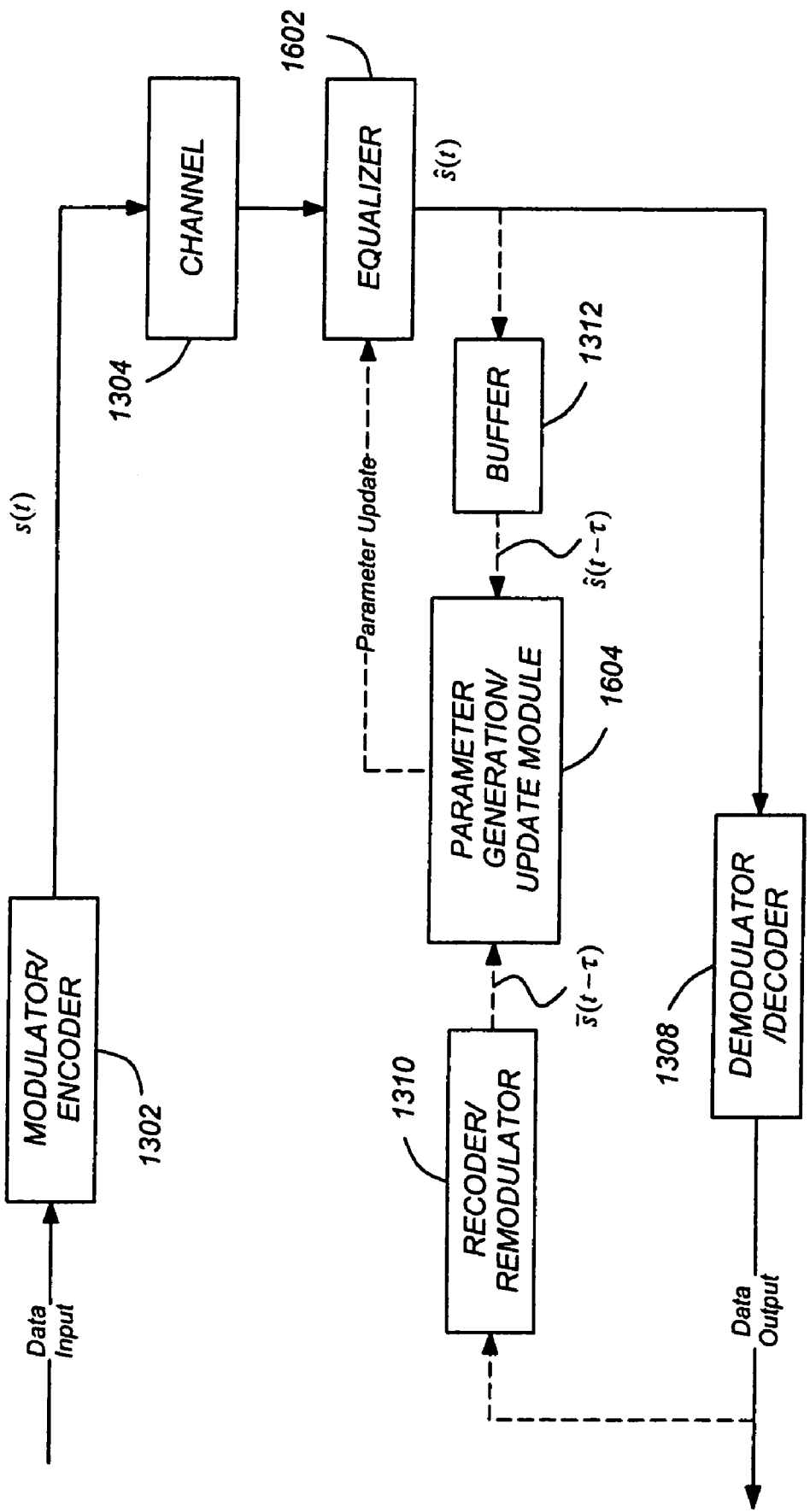
FIG. 16 is a block diagram illustrating an unblind equalizer that recursively updates equalizer parameters.

FIG. 16 illustrates an unblind equalizer that recursively updates equalizer parameters. Comparing this embodiment with the embodiment illustrated in FIGS. 13 and 14, the parameter generation/update module 1604 forces its two inputs to be identical through a filtering process.

Figure 17:
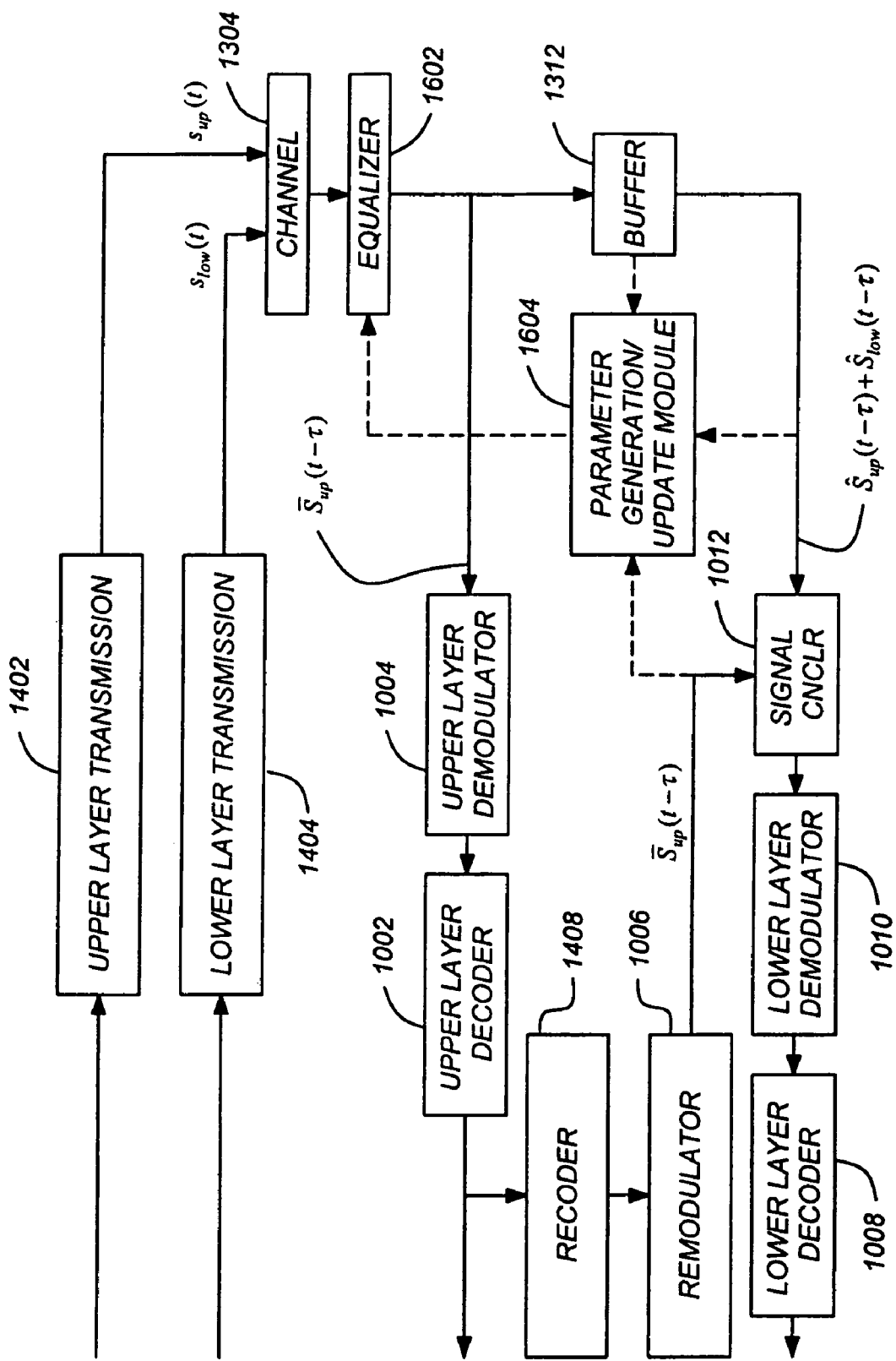
FIG. 17 is a block diagram illustrating the unblind equalizer of FIG. 16 as applied to a layered modulation system.

FIG. 17 illustrates the unblind equalizer of FIG. 16 as applied to a layered modulation system. This embodiment uses a single equalizer 1602, unlike the embodiment shown in FIG. 14.

Unblind equalizers can be used in a conventional and/or an adaptive manner. Conventionally, it is assumed that the channel 1304 characteristics are either time-invariant or slowly changing in time. In such circumstances, once the equalizer is defined, the same equalizer parameters (e.g. structure and coefficients) can be used without further change. Where the channel 1304 characteristics change significantly over time, an adaptive unblind equalizer can be utilized. In such cases, the parameter generation/update module 1314, 1604 can continually accept renewed data and continue to update the parameters of the equalizer(s).

In the case of multi-layer modulation, it can generally be assumed that the system is capable of detecting the transmitted information within certain error rates, even without equalization. In most cases, the upper layer may be demodulated with a relatively low BER. However, in general cases where the system includes only one layer of modulation, it may be difficult to adequately detect the transmitted information without equalization. In such cases, the more traditional equalizers (using training sequences or blind equalizers) can be used to improve the signal, with the unblind equalizer accepting the equalized signal and providing further performance improvements.

For example, the unblind equalizer can be used with a training sequence equalizer. A system using a training system equalizer assumes the signal channel is static during the data transmission. If the channel varies, the system has to wait until the next training sequence before the system can make any correction. The training sequence must have a length long enough to be able to adequately train the equalizer, and the training sequence must be repeated on a periodic or aperiodic basis in order to keep the equalizer updated.

Although the training sequence provides perfect knowledge of the transmitted data sequence, it consumes some of the transmitting capacity. Hence, it is not cost effective to use a long training sequence or to frequently use a training sequence.

The unblind equalizer can be used to ameliorate the weaknesses of the training sequence equalizer. This can be accomplished by using the unblind equalizer to update the training equalizer after the training sequence equalizer has established the equalizer and the communications link. An unblind equalizer can also be used without the need of any additional training sequence once the receiver is able to receive the transmitted data.

FIG. 18A illustrates a state transition diagram for the use of an unblind equalizer in combination with a training sequence equalizer. At the beginning of the transmission the system uses the training sequence equalizer 1802. When the system begins receiving the transmitted data, the system switches to select use of an unblind equalizer 1804. When a training sequence is received again, the training sequence equalizer 1802 is used once again; when the training sequence has been received, the unblind equalizer 1804 is again used. This system takes advantage of the training sequence's perfectly matched data, can reduce the repeated frequency of the training sequence transmissions (using the pseudo-training sequence), and can keep the equalizer updated in a dynamically changing channel environment.

A system without a training sequence may require an equalizer to generate a sufficiently error-free signal to allow the unblind equalizer to effectively function. In this situation, a blind equalizer can be used before the unblind equalizer is employed. With the help of the blind equalizer, the system is able to receive the transmitted data. As soon as the system is able to do so, a pseudo-training sequence can be derived and the unblind equalizer can be employed. Since the unblind equalizer uses the received data as its training sequence, equalizer parameters can be more accurately determined, improving equalizer performance.

FIG. 18B illustrates a state transition diagram for the use of an unblind equalizer with a blind equalizer. At the beginning of the transmission, the system uses a blind equalizer 1806. When the system begins receiving the transmitted data, the system switches to select the use of an unblind equalizer. This technique can be used when the channel changes slowly compared to data processing (demodulation, decoding, re-encoding and remodulation) time delay. This system does not require any training sequence and thus improves transmission capacity, while improving accuracy to that of the training sequence equalizer and may be used in a dynamically changing transmission channel environment.

Blanket Equalizer Architecture

Additional improvements can be made to the architecture of the equalizer in order to avoid residual inter-symbol interference (ISI). ISI comes from symbols that have not been received and therefore its effects cannot be completely removed from an equalizer. Specifically, in a decision-feedback equalizer (DFE), residual ISI exists after equalization. With the present invention, however, ISI can be completely quantified and removed, which results in a nearly perfect equalizer for the processing of a subsequent signal.

Two pieces of information are required to construct an equalizer. The first piece of information is the channel model, such as frequency response of a filter or the multi-path characteristics of the signal propagation channel. The second piece of information is the transmitted symbols around the symbol being demodulated. The channel model and the adjacent symbols combine to determine the exact amount of distortions at the symbol time. Often, only partial information about these two pieces of information can be obtained, resulting in a suboptimal equalizer.

The present invention improves upon the unblind equalizer described above, and claimed in the and commonly-assigned Utility patent application Ser. No. 10/691,032, filed Oct. 22, 2003, by Weizheng Wang, Tung-Sheng Lin, Ernest C. Chen, and William C. Lindsey, entitled "UNBLIND EQUALIZER ARCHITECTURE FOR DIGITAL COMMUNICATION SYSTEMS," which application claims the benefit of U.S. Provisional Patent Application No. 60/421,329, filed Oct. 25, 2002, by Weizheng Wang, Tung-Sheng Lin, Ernest C. Chen, and William C. Lindsey, entitled "INNOVATIVE UNBLIND EQUALIZER ARCHITECTURE FOR DIGITAL COMMUNICATION SYSTEMS," both of which applications are incorporated by reference herein.

The present invention uses a signal reconstruction technique to re-create a "training" symbol sequence from the received signal. By using these essentially perfect, re-created training symbol sequences, the channel model can be constructed very accurately. The present invention further offers a technique to obtain symbols adjacent to a given symbol. Specifically, the present invention decodes the received symbols around a given symbol with quasi error-free performance, re-encodes the decoded symbols into a nearly perfect signal and compares the re-encoded signal with the received signal to determine the exact channel distortion.

The highly accurate channel characteristics derived from the unblind equalizer described above and the nearly perfect adjacent symbols derived from the present invention combine to reproduce exact channel impairments, such as inter-symbol interference, which can be subtracted from the received signal to provide a nearly perfect equalization.

In the present invention, the equalizer constructs a pseudo-training sequence from the received data to determine the exact channel model. Consequently, there is no need for a training symbol sequence to be inserted into the payload data. Therefore, the technique is backwards compatible with existing signal formats and there is no throughput reduction. Thus, the present invention improves upon the unblind equalizer by offering an equalizer that uses a nearly perfect channel model and error-free symbols.

Contrast this with a conventional DFE, where symbols that occur after the current symbol cannot be observed, resulting in performance degradation in the feed-forward section of the equalizer. In addition, symbols that occurred before the current symbol are corrupted with uncoded bit errors because they are obtained prior to error correction. The uncoded bit error rate may be as high as 10% or more for a signal encoded by some advanced coding schemes.

However, the unblind equalizer obtains a quasi error-free symbol sequence through the reconstruction of the upper-layer signal. The present invention takes this one step further and uses the reconstructed, quasi error-free symbol sequence in place of a sub-optimal feed-forward section of the equalizer. Consequently, the reconstructed, quasi error-free symbol sequence obtained from the unblind equalizer provides nearly perfect knowledge about the channel model. The signal reconstruction process of the present invention provides error-free adjacent symbols, which results in a nearly perfect linear equalizer.

There are, however, some disadvantages to the present invention. For a layer-modulated signal, the equalizer output is delayed due to the re-construction of the upper-layer signal. Since demodulation is sequential between the two layers, the scheme relies on the upper-layer signal being demodulated and decoded correctly for the reconstruction of the symbols and therefore the channel model. For applications with signal formats other than layered modulation, a similar latency exists between the time the data is received for equalization and the time the equalizer coefficients are available. Generally, the amount of latency is on the order of a transport length of the FEC code.

Figure 19:
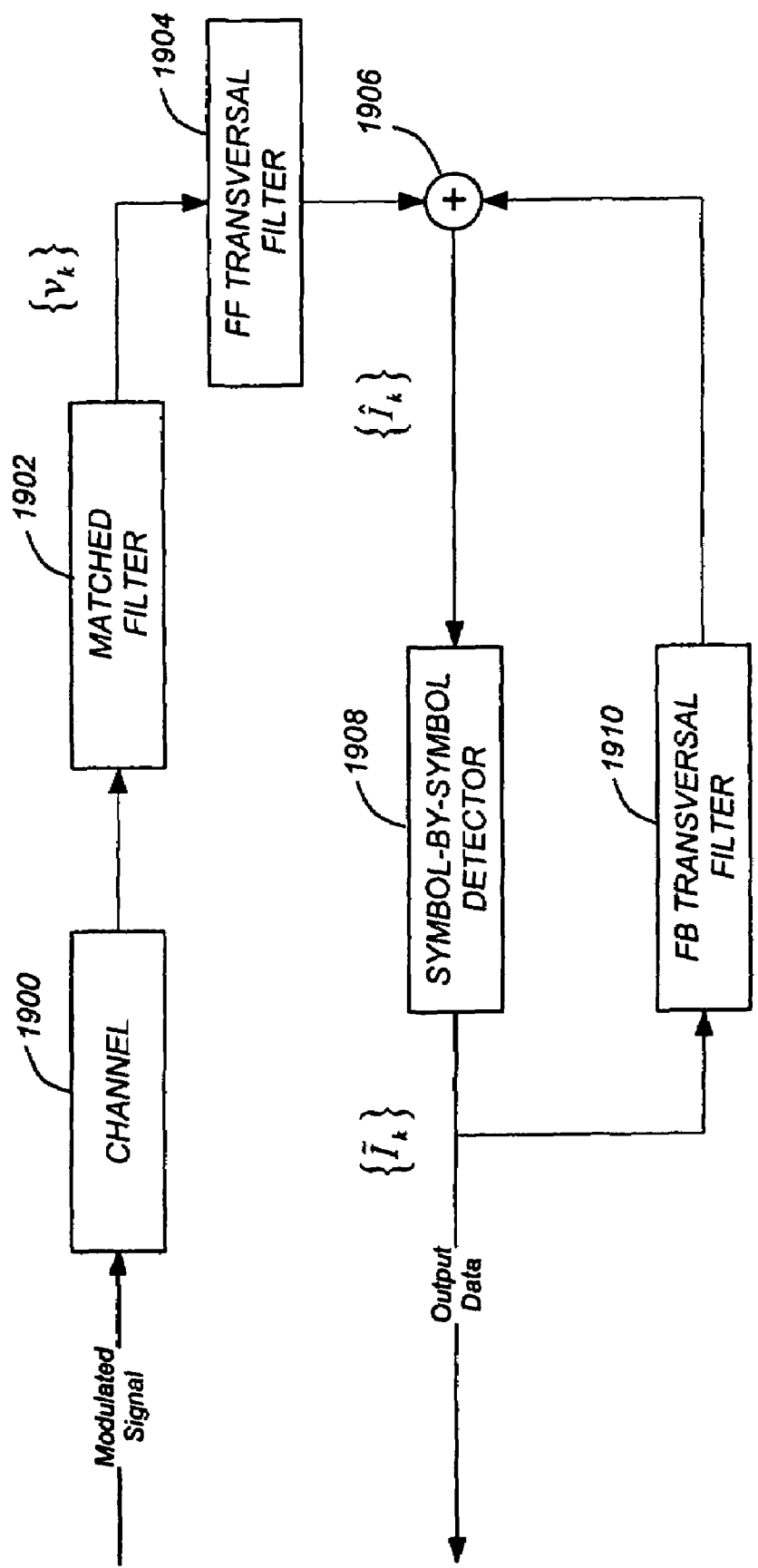
FIG. 19 is a block diagram of a conventional distributed feedback equalizer (DFE) that may be used in the present invention.

FIG. 19 is a block diagram of a conventional distributed feedback equalizer (DFE) that may be used in the present invention. The incoming modulated signal is received by a channel 1900 and filtered by a matched filter 1902. The additive noise sequence of the matched filter 1902, denoted as $v_k$, is then input to the DFE, which is comprised of a feed-forward (FF) transversal filter 1904, an adder 1906, a feedback (FB) transversal filter 1908 and a symbol-by-symbol detector 1910. The output of the FF transversal filter 1904 and FB transversal filter 1910 are summed at the adder 1906 to create an estimated symbol sequence $\hat{I}_k$ as input to the symbol-by-symbol detector 1908. The reconstructed symbol sequence $\tilde{I}_k$ output from the symbol-by-symbol detector 1908 is fed back into the FB transversal filter 1910 as a previous symbol sequence and also comprises the output of the DFE.

Both the FF transversal filter 1904 and FB transversal filter 1910 comprise transversal (convolutional) filters with coefficients determined by the estimated channel model. The FF transversal filter 1904 is a "blind" equalizer that compensates for distortion from future symbols, which are not yet available. The FB transversal filter 1910 also includes an uncoded symbol detector. Without a training sequence, channel estimation is "blind" since it lacks the full knowledge about the symbols that are used in estimating the equalizer coefficients. Furthermore, symbol decision errors in the FB transversal filter 1910 degrade the performance of the equalizer.

Figure 20:
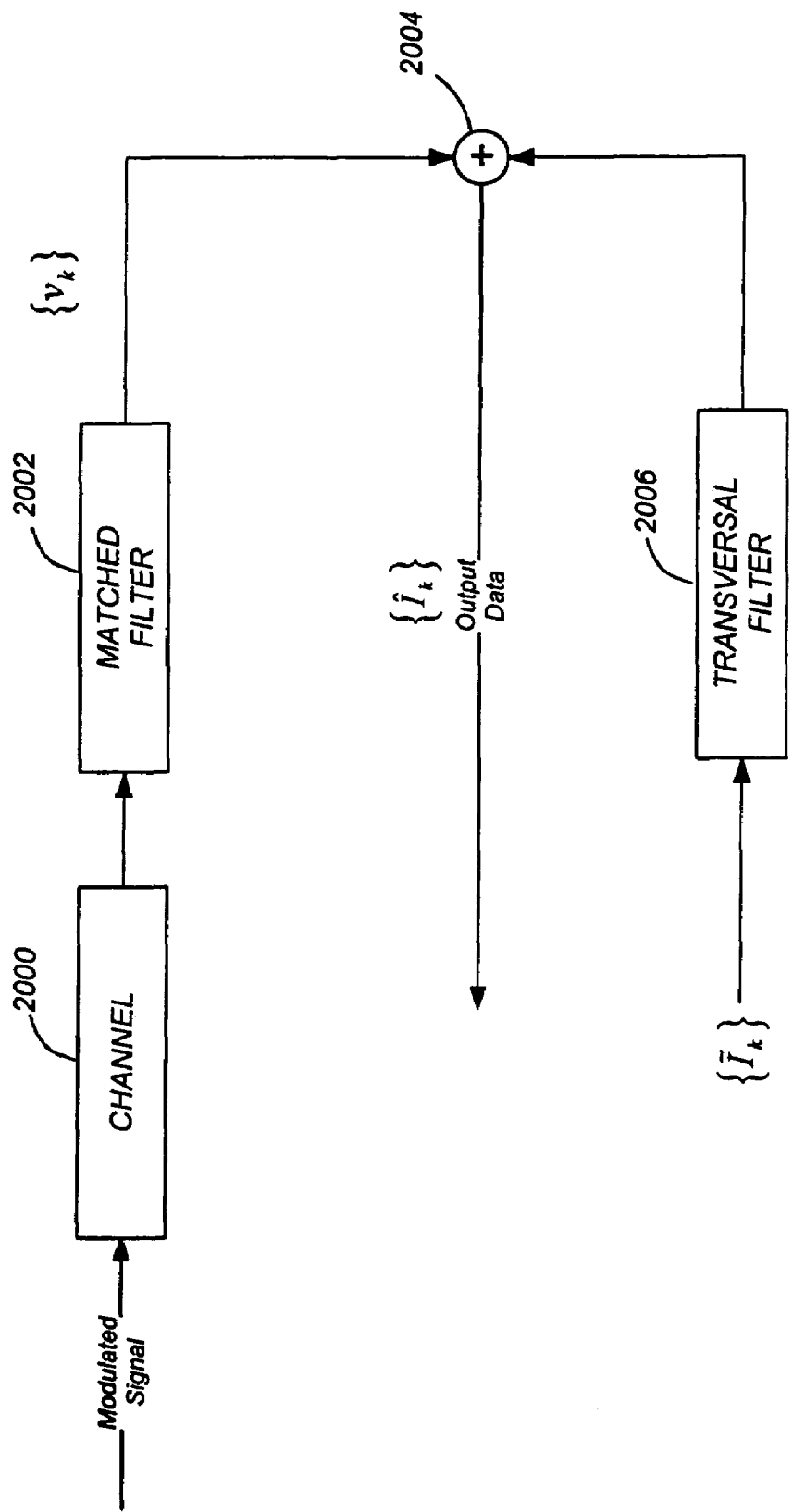
FIG. 20 is a block diagram of a proposed blanket equalizer that incorporates the functionality of the unblind equalizer described above, and the signal reconstruction technique that re-creates a "training" symbol sequence from the received signal.

FIG. 20 is a block diagram of an embodiment of a blanket equalizer that incorporates the functionality of the unblind equalizer described above with the signal reconstruction technique that re-creates a training sequence from the received signal. The incoming modulated signal is received by a channel 2000 and filtered by a matched filter 2002. The output $v_k$ of the matched filter 2002 is then input to the blanket equalizer, which is comprised of an adder 2004 and a transversal filter 2006. The input to the transversal filter 2006 is the reconstructed symbol sequence $\{\tilde{I}_k\}$ from a DFE, such as shown in FIG. 19, which is summed with the output $v_k$ of the matched filter 2002 at the adder 2004. The output data of the adder 2004 comprises the estimated symbol sequence $\{\hat{I}_k\}$.

The nearly perfect adjacent symbols provided by the present invention and the channel model provided by the unblind equalizer described above allow exact channel impairments to be reproduced, which can then be subtracted from the received signal for nearly perfect equalization. However, since all symbols are available from the re-encoding and re-modulation process, there is no need to use a DFE structure for the proposed blanket equalizer. The channel model is also nearly perfect since it is obtained from reconstructed symbols that are essentially error-free. As a result, the equalizer performance is significantly improved over a conventional DFE.

Figure 21:
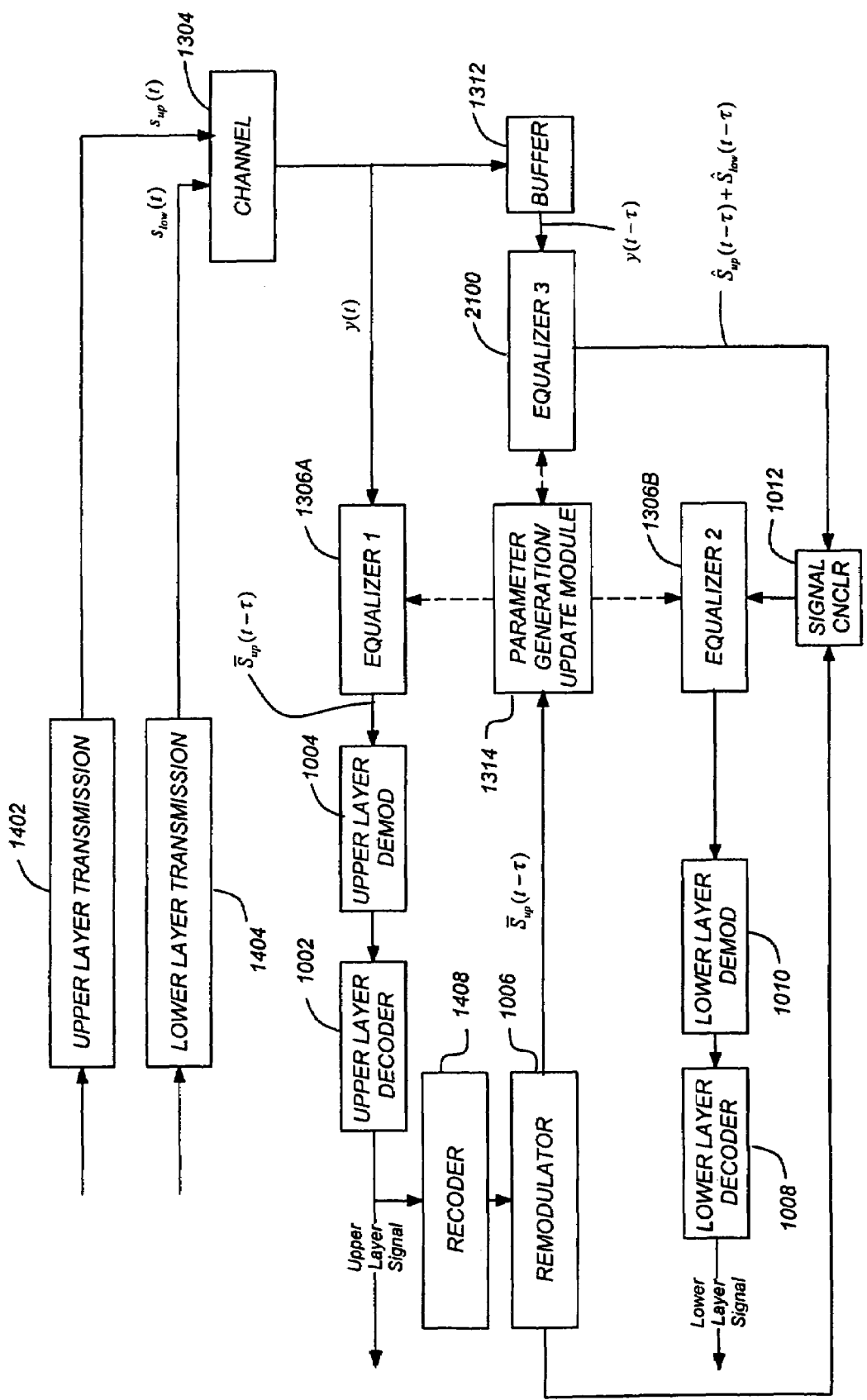
FIG. 21 illustrates an example application of the equalization for a layer-modulated signal performed by the present invention.

FIG. 21 illustrates an example of an application of the equalization for a layer-modulated signal performed by the present invention. Note that FIG. 21 is similar to FIG. 14 except that it includes an additional third equalizer 2100 and the signal canceller 1012 is relocated, wherein the parameters of the first equalizer 1306A, second equalizer 1306B and third equalizer 2100 are all updated with equalizer parameters generated or updated in the parameter generation/update module 1314. The parameter generation/update module 1314 also provides the reconstructed symbol sequence received from the remodulator 1006 to the third equalizer 2100.

Preferably, in FIG. 21, the first equalizer 1306A and second equalizer 1306B are DFEs, as described above in FIG. 19. However, the third equalizer 2100 is a blanket equalizer as described above in FIG. 20. The three equalizers 1306A, 1306B and 2100 are all based on the single channel model obtained from the nearly perfectly reconstructed symbols.

The first equalizer 1306A works on the incoming composite signal and comprises a conventional DFE with FF and FB transversal filters (except that the channel model is nearly perfect as discussed above). The second equalizer 1306B works on the extracted lower-layer signal and also comprises a conventional DFE with the FF and FB transversal filters (and a nearly perfect channel model). The third equalizer 2100 works on the delayed version of the incoming signal, i.e., the previous or reconstructed symbol sequence $\{\tilde{I}_k\}$, and comprises the equalizer of FIG. 20, since all adjacent symbols are available from the signal reconstruction process at this point.

Note that, in this structure, the first and second equalizers 1306A and 1306B are optional. The receiver design can trade equalization performance for reduced hardware complexity. Most equalization gain is provided by the third equalizer 2100.

In conclusion, higher-order modulations, such as LM, require channel equalization to minimize linear distortion effects. The present invention proposes a method to perform equalization for LM as well as conventional signal formats. Coupled with the unblind equalizer, the present invention discloses an improved equalizer with a pseudo-training sequence for LM.

Hardware Environment

Figure 22:
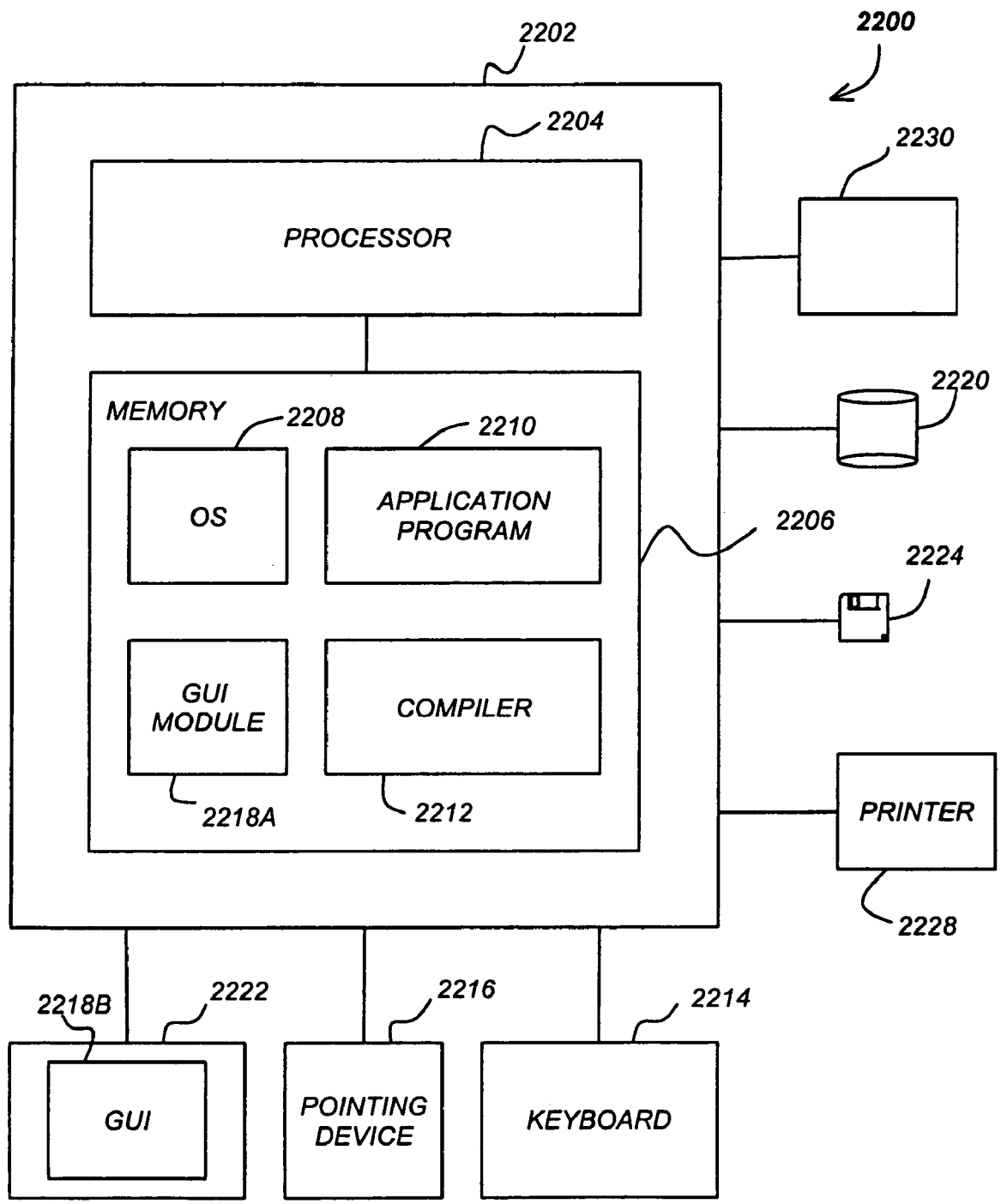
FIG. 22 illustrates an exemplary computer system that could be used to implement selected modules or functions the present invention.

FIG. 22 illustrates an exemplary computer system 2200 that could be used to implement selected modules or functions the present invention. The computer 2202 comprises a processor 2204 and a memory, such as random access memory (RAM) 2206. The computer 2202 is operatively coupled to a display 2222, which presents images such as windows to the user on a graphical user interface 2218B. The computer 2202 may be coupled to other devices, such as a keyboard 2214, a mouse device 2216, a printer, etc. Of course, those skilled in the art will recognize that any combination of the above components, or any number of different components, peripherals, and other devices, may be used with the computer 2202.

Generally, the computer 2202 operates under control of an operating system 2208 stored in the memory 2206, and interfaces with the user to accept inputs and commands and to present results through a graphical user interface (GUI) module 2218A. Although the GUI module 2218A is depicted as a separate module, the instructions performing the GUI functions can be resident or distributed in the operating system 2208, the computer program 2210, or implemented with special purpose memory and processors. The computer 2202 also implements a compiler 2212 which allows an application program 2210 written in a programming language such as COBOL, C++, FORTRAN, or other language to be translated into processor 2204 readable code. After completion, the application 2210 accesses and manipulates data stored in the memory 2206 of the computer 2202 using the relationships and logic that was generated using the compiler 2212. The computer 2202 also optionally comprises an external communication device such as a modem, satellite link, Ethernet card, or other device for communicating with other computers.

In one embodiment, instructions implementing the operating system 2208, the computer program 2210, and the compiler 2212 are tangibly embodied in a computer-readable medium, e.g., data storage device 2220, which could include one or more fixed or removable data storage devices, such as a zip drive, floppy disc drive 2224, hard drive, CD-ROM drive, tape drive, etc. Further, the operating system 2208 and the computer program 2210 are comprised of instructions which, when read and executed by the computer 2202, causes the computer 2202 to perform the steps necessary to implement and/or use the present invention. Computer program 2210 and/or operating instructions may also be tangibly embodied in memory 2206 and/or data communications devices 2230, thereby making a computer program product or article of manufacture according to the invention. As such, the terms "article of manufacture", "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A blanket equalizer for equalizing digital data signals, comprising:
   a distributed feedback equalizer for accepting an input signal, the distributed feedback equalizer comprising:
      a feedforward transversal filter for filtering the input signal;
      a first adder having a first input coupled to the feedforward transversal filter, a second input, and an output having the sum of the first input and the second input;
      a symbol detector, having an input coupled to the output of the first adder and an output providing detected symbols;
      a feedback transversal filter, having an input coupled to the symbol detector output, and an output coupled to the first adder second input;
   a third transversal filter, coupled to the symbol detector for receiving the detected symbols and for filtering the detected symbols; and
   a second adder for summing an input signal and the filtered detected symbols from the third transversal filter to create an estimated symbol sequence.

2. The blanket equalizer of claim 1, wherein the input signal is filtered by a matched filter having an output and the matched filter's output is input to the second adder.

* * * * *